United States Patent [19]

Cohen et al.

[11] Patent Number: 5,285,305

[45] Date of Patent: Feb. 8, 1994

[54] OPTICAL COMMUNICATION NETWORK WITH PASSIVE MONITORING

[75] Inventors: Leonard G. Cohen, Berkeley Heights; Jack H. Winters, Middletown, both of N.J.

[73] Assignee: AT & T Bell Laboratories, Murray Hill, N.J.

[21] Appl. No.: 806,561

[22] Filed: Dec. 12, 1991

[51] Int. Cl.⁵ .................. H04B 10/08; H04B 10/12; H04J 14/02

[52] U.S. Cl. ................................ 359/110; 359/127; 359/137; 359/161; 359/167; 359/177

[58] Field of Search .............. 359/123, 110, 121, 127, 359/135, 137, 125, 158, 161, 167, 178, 177, 120; 370/94.3

[56] References Cited

U.S. PATENT DOCUMENTS

| | | | |
|---|---|---|---|
| 4,306,313 | 12/1981 | Baldwin | 359/178 |
| 4,590,619 | 5/1986 | Winzer | 359/167 |
| 4,709,418 | 11/1987 | Fox | 359/167 |
| 4,902,086 | 2/1990 | Henry et al. | 350/96.12 |
| 4,977,593 | 12/1990 | Ballance | 380/2 |

FOREIGN PATENT DOCUMENTS 01-29546  5/1989  Japan .................. 359/121

OTHER PUBLICATIONS

C. Dragone, et al., "Efficient Multichannel Integrated Optics Star Coupler on Silicon," *IEEE Photon. Tech. Lett.* 1, Aug. 1989, pp. 241–243.

C. Dragone, "An N x N Optical Multiplexer Using a Planar Arrangement of Two Star Couplers," *IEEE Photon. Tech. Lett.* 3, Sept. 1991, pp. 812–815.

C. Dragone, et al., "Integrated Optics N x N Multiplexer on Silicon," *IEEE Photon. Tech. Lett.* 3, Oct. 1991, pp. 896–899.

J. R. Stern, et al., "Passive Optical Local Networks for Telephony Applications and Beyond," *Elect. Lett.* 23, (1987) 1255–57.

I. Sankawa, "Fault Location Technique for In-Service Branched Optical Fiber Networks," *IEEE Photon. Tech. Lett.* 2, (1990) 766–68.

I. Sankawa, et al., "Fiber Measurement Techniques For Passive Double Star Networks," Third IEEE Workshop on Local Optical Networks, (Sep. 24, 1991), 4.2-1 to 4.2-10.

K. Kumozaki et al., "A Study on the Maintenance Aspects of Passive Double Star Networks For Local Loops," IEEE Workshop on Local Optical Networks (May 1990), Section 4.3/1.

*Primary Examiner*—Leslie Pascal
*Attorney, Agent, or Firm*—Martin I. Finston

[57] ABSTRACT

An optical communication network includes at least one single-mode fiber, referred to as a "primary fiber," for transmission between a central office and a distribution node, and at least one multiplicity of single-mode fibers, referred to as "distribution fibers," for transmission between the distribution node and a multiplicity of optical network units (ONUs). Transmissions are exchanged between the primary and distribution fibers via at least one optical coupler located at the distribution node. The network is passive in the sense that all monitoring of the transmission media and the ONUs can be performed at the central office, without active intervention at remote locations. The network includes a monitor and a multiplicity of bypass lines by means of which at least a portion of inbound signals from the distribution fibers are transmitted to the monitor without passing through the optical coupler at the distribution node.

27 Claims, 11 Drawing Sheets

OPTICAL COMMUNICATION NETWORK WITH PASSIVE MONITORING

FIELD OF THE INVENTION

This invention relates to optical fiber communication networks.

ART BACKGROUND

In a passive optical communication network, signals from a central office are transmitted through one or more coupling elements to as many as 64 optical network unit (ONU) receivers. Conventional monitoring techniques cannot readily be used to identify faults on individual fibers since the inputs and outputs from each ONU distribution fiber are conventionally multiplexed onto the same feeder fiber going to the central office. Optical time domain reflectometry (OTDR) has, in fact, been used to locate anomalous losses in passive optical networks. However, means have been generally unavailable for identifying features in the received OTDR signals with particular distribution fibers with adequate specificity. Moreover, coupling losses in conventional networks have reduced the sensitivity of OTDR techniques, placing large demands on the power of OTDR laser transmitters.

SUMMARY OF THE INVENTION

Very generally, the inventive network includes a primary optical fiber to carry transmissions between a distribution node and a central office, multiple distribution fibers terminating at ONUs to carry transmissions between the ONUs and the node, and an optical coupler at the node. The network also includes a monitor for receiving transmissions which may include diagnostic information, and additional optical fibers (referred to as "bypass lines") which convey portions of at least some transmissions from the distribution fibers to the monitor without passing through the coupler. The network also includes passive components which physically label the transmissions in the bypass lines in such a way that diagnostic information can be ascribed to individual distribution fibers. The physical labeling is achieved by assigning to each distribution fiber one or more time delays, one or more monitor wavelengths, or a combination of time delays and wavelengths. In this way, coupling losses in monitored transmissions are reduced relative to conventional networks, and individual distribution fibers can be identified using purely passive components.

The invention is more conveniently described with reference to a specific embodiment, depicted in FIG. 1. It should be noted that such embodiment is purely illustrative and not intended to limit the scope of the invention. With reference to FIG. 1, an optical communication network, exemplarily a telephone network, includes at least one single-mode optical fiber 10 for bidirectional transmission between a central office 20 and a distribution node 30. The network further includes a multiplicity of optical network units (ONUs) 40 at locations which are remote with respect to the central office. Each such remote location is, e.g., a home, or office, or a curbside substation. The network is passive in the sense that all monitoring of the transmission media and the ONUs can be performed at the central office, without active intervention at remote locations. Significantly, most or all of the information needed for diagnosing faults in the network is impressed upon the monitored signals by passive components. The term "passive optical network" (PON) will hereinafter be used to describe each fiber 10, corresponding multiplicity of ONUs 40, and the intermediate network components which lie between them. (It should be noted that instead of bidirectional fiber 10, a pair of unidirectional fibers may be used. One such unidirectional fiber belongs to an inbound, and the other to an outbound, PON, as discussed below.) Multiple fibers 10 may emanate from a single central office, and thus one central office may support a multiplicity of PONs.

Each ONU is capable of sending and receiving optical signals which represent digitized communication signals. For signal transmission, each ONU includes, e.g., a solid state diode laser operating at a predetermined signal wavelength. Each ONU 40 communicates bidirectionally with node 30 by way of, e.g., one single-mode optical fiber 50. (Alternatively, a pair of unidirectionally transmitting fibers may be provided in place of fiber 50. In such a case, as noted above, a pair of similar passive networks are provided, one for each direction of transmission between the central office and the ONUs.) Because transmissions from multiple ONUs are carried on a single fiber 10, some form of multiplexing is needed. Accordingly, the network further includes means for synchronizing the transmissions from the ONUs in order to produce a time-division multiplexed signal that can be carried by fiber 10 toward the central office. That is, time-division multiplexing is used to interleave pulse packets from different ONUs. The bit rate within a packet is typically about 30 Megabit/s, and thus individual pulses are typically separated by about 35 ns. A guard band, typically about 500 ns wide, is used to separate the pulse packets from different ONUs.

Signals which are transmitted from the central office toward the ONUs will be referred to herein as "outbound signals". Signals transmitted oppositely will be referred to as "inbound signals." At node 30, each outbound signal is distributed from fiber 10 into multiple fibers 50. Fiber 10 (as well as additional fibers which function analogously to fiber 10) will be referred to herein as a "primary fiber." Fibers 50 (and analogously functioning fibers) will be referred to as "distribution fibers" because, inter alia, they distribute outbound signals to the ONUs. At least some of the components of the network have two ends which may be defined with reference to the directions of signal transmissions. That is, the end of such a component that is closer to a source of outbound signals is herein referred to as the "proximal" end, because it is "proximal" the central office. Similarly, the end that is closer to a source of inbound signals is referred to as the "distal" end because it is "distal" the central office.

At node 30, the outbound signal on fiber 10 is distributed by, e.g., star coupler 60. The exemplary star coupler has multiple ports on its distal end, and also has multiple ports on its proximal end. (Star coupler 60 is typically an N×N coupler where N is generally at least 8, and is more typically 16.) An end of fiber 10 is connected to one of the proximal ports, such that optical signals pass, e.g., bidirectionally between fiber 10 and the star coupler. Each of fibers 50 is connected, by one end, to one of the distal ports of star coupler 60, such that optical signals pass, e.g., bidirectionally between the respective fiber and the star coupler. Star coupler 60 (as well as additional star couplers which function analogously to it) is referred to herein as a "Stage-1" star coupler. Significantly, star coupler 60 passively splits transmissions from the central office into fibers 50, and it passively combines transmissions from ONUs 40 into fiber 10. (In alternate embodiments, separate inbound and outbound couplers are provided.)

The network also includes a monitor 70 which can be used to detect diagnostic signals. At least some of the signals received by monitor 70 are inbound signals which originate at one or more ONUs, but do not pass through star coupler 60. Instead, optical couplers 80 (which are, exemplarily, 10-dB couplers) are provided to divert portions of inbound signals from at least some of fibers 50 into the distal ends of corresponding bypass lines 90. Each of bypass lines 90 is a single-mode optical fiber. The proximal end of each bypass line 90 optically communicates (at least with respect to inbound transmissions) with monitor 70 such that inbound transmissions are delivered to the monitor without first passing through the star coupler.

In an alternate embodiment, the inventive network includes OTDR monitor 220 of FIG. 12 instead of ONU monitor 70. The OTDR monitor is used to monitor optical loss in individual fibers, loss in splices and connectors, and the locations of fiber faults, such as breaks. At least a portion of the inbound OTDR diagnostic transmissions are delivered to the OTDR monitor without first passing through the star coupler. Preferred embodiments include both an ONU monitor and an OTDR monitor. Still more preferably, the ONU monitor and the OTDR monitor are incorporated in the network using silicon optical bench (SiOB) technology, which is a technology of optical waveguide integrated circuit platforms.

One primary fiber can serve, typically, as many as about 64 ONUs. Thus, about 640 ONUs are readily served from a single central office from which radiate ten primary fibers.

It should be noted that although diagnostic information can be retrieved at the central office through the use of purely passive components, it may be useful to employ an optical amplifier in order to overcome signal loss in the network. Such an amplifier is readily incorporated in the single-mode fiber which carries the signal transmissions into the central office. In fact, such an amplifier is preferably located within the central office in order to avoid the need for remote pumping, and in order to facilitate replacement. In cases where transmission through such an amplifier would interfere with the monitoring scheme, means are readily provided for bypassing the amplifier.

In a broad sense, the invention is an optical communication network which comprises at least one first primary fiber for at least unidirectional transmission from a first distribution node to a central office; a first multiplicity of ONUs, located remotely from the central office, each ONU capable of transmitting and receiving data at least at one signal wavelength; a first multiplicity of distribution fibers for at least unidirectional transmission from the first ONUs to the first distribution node such that each ONU sends data via a respective one of the first distribution fibers; first coupling means, located at the first distribution node, for passively combining transmissions from the first ONUs into the first primary fiber; and means for synchronizing the transmissions from the ONUs, resulting in transmission of a time-division-multiplexed signal to the central office. Moreover, the first coupling means comprise a Stage-1 coupler which has a proximal end including at least one proximal port and a distal end including a plurality of distal ports, each first distribution fiber is optically coupled to one of the distal ports, and the first primary fiber is optically coupled to the proximal port of the Stage-1 coupler. The network further comprises a monitor and a first plurality of bypass lines, each comprising a single-mode optical fiber having proximal and distal ends, the distal end optically coupled to one of the first distribution fibers and the proximal end optically coupled to the monitor. Each bypass line is coupled to the monitor such that portions of at least some transmissions are received by the monitor without passing through the first Stage-1 coupler. Still further, there is associated with each bypass line at least one monitor wavelength or at least one time delay which at least partially identifies the distribution fiber to which that bypass line is coupled. As a result of such association, the locations of at least some faults in the network can be determined on the basis of the delays and/or monitor wavelengths.

DETAILED DESCRIPTION

Figure 1:
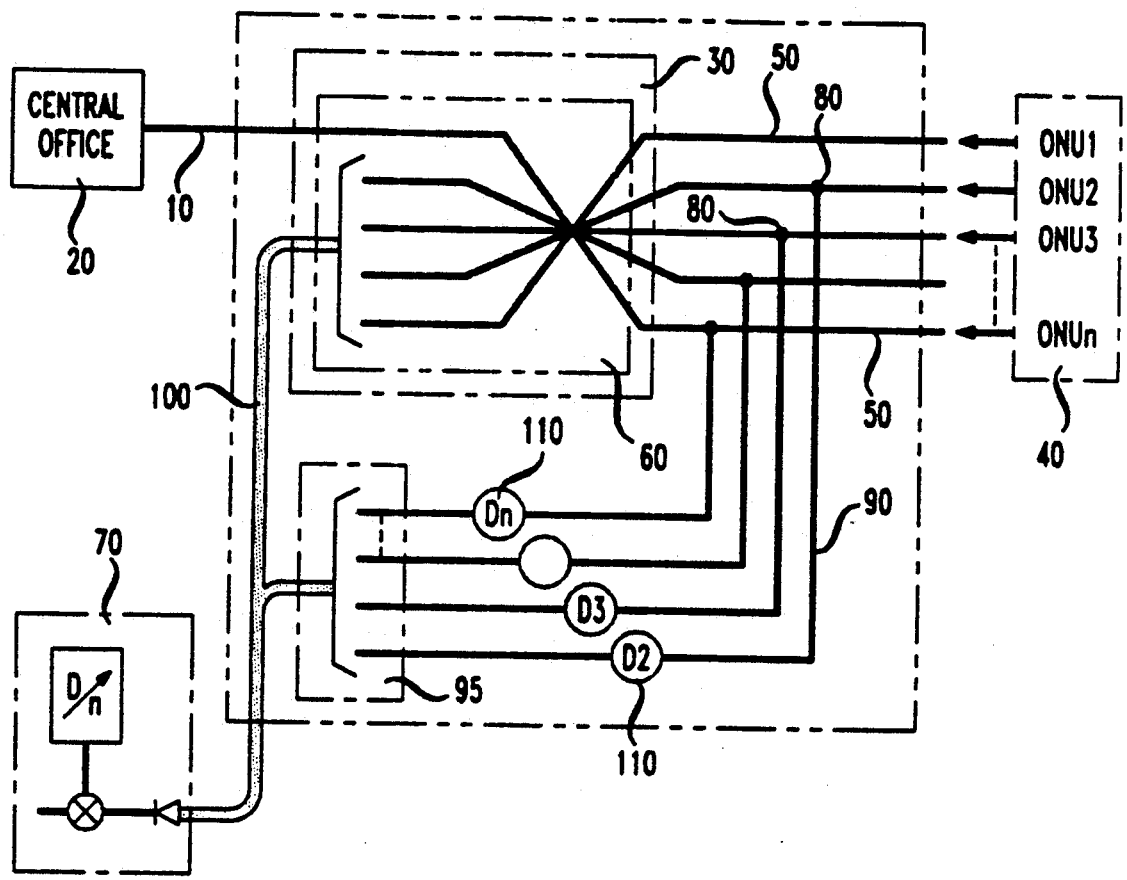
FIG. 1 is a schematic drawing of the inventive network, in one embodiment.

Turning again to FIG. 1, the inventive network in one embodiment further includes a multimode fiber 100 which is optically coupled at its proximal end to monitor 70, and at its distal end to one or more proximal ports of star coupler 60, exclusive of the port to which fiber 10 is attached. (Embodiments of the invention which include star couplers are described for illustrative purposes. Alternate embodiments of the invention which have the same architectures as those described, but which use splitters, combiners, and couplers other than star couplers are readily envisioned.) Fiber 100 (as well as additional multimode fibers which function analogously to fiber 100) is referred to herein as a "Stage-1 loopback fiber". The proximal end of each of N bypass lines 90 is connected to the loopback fiber by means of a coupler 95 suitable for combining the output of N single-mode fibers into the multimode loopback fiber. As a consequence, inbound signals on the bypass lines are coupled into the loopback fiber, and from the loopback fiber into the monitor.

Figure 2:
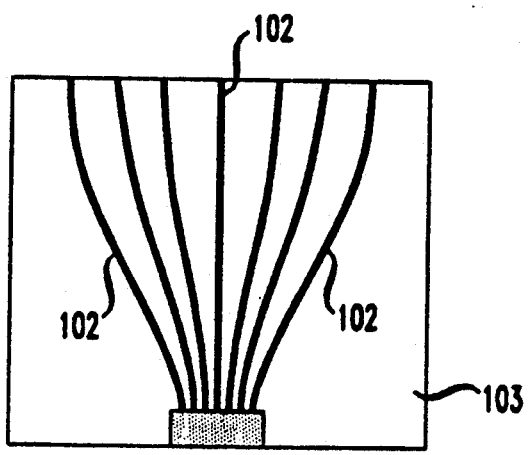
FIG. 2 is a schematic representation of an exemplary single-mode-to-multimode optical coupler.

A suitable single-mode-to-multimode coupler is conveniently described in terms of the single-mode fiber core diameter a, core-to-cladding refractive-index difference Δ, cladding refractive index n, and numerical aperture n.a. An exemplary, commercially available multimode fiber has a core diameter of 62.5 μm and a numerical aperture of about 0.22. The coupler is formed, as shown in FIG. 2, by, in effect, tapering down to insignificant size the cladding thicknesses which separate the cores of N respective single-mode waveguiding channels 102. The resulting waveguide has a core diameter of N×a and a numerical aperture of n.a. In order to have efficient power coupling to the multimode loopback fiber, the numerical aperture of the loopback fiber should also be n.a., and the core diameter of the loopback fiber should be N×a.

The coupler is exemplarily manufactured by fabricating glass waveguides on a silicon substrate 103. Suitable dimensions are a=4 μm, Δ=0.014, and n.a.=0.22. Manufacture of components on a SiOB platform typically involves oxidation of the surface of a single-crystal silicon substrate, followed by phosphosilicate glass deposition, selective glass removal to define the waveguides, smoothing of the waveguides by heating, and deposition of a silica glass cladding. These fabrication processes are described in U.S. Pat. No. 4,902,086, issued to C. H. Henry and R. A. Levy on Feb. 20, 1990.

Figure 3:
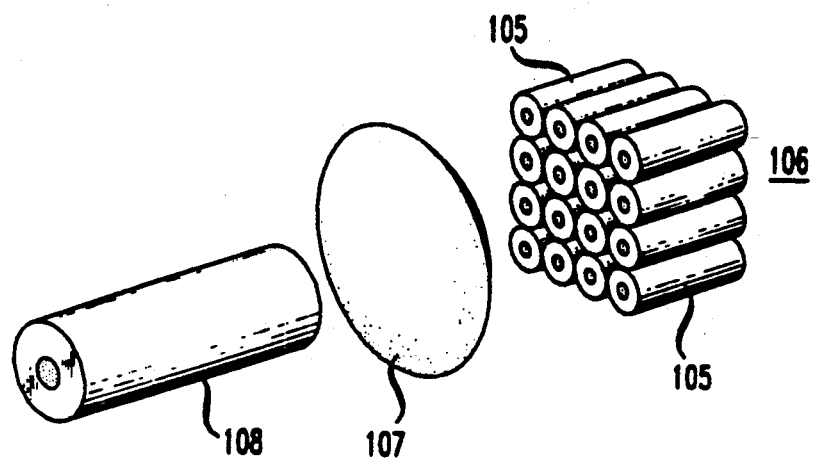
FIG. 3 is a schematic representation of an alternate single-mode-to-multimode optical coupler.

An alternative coupling strategy, depicted in FIG. 3, uses fused fiber couplers instead of SiOB components. Exemplarily, single-mode fibers 105 are used having a=8 μm and n.a.=approx. 0.1. The fibers are etched down to an outer diameter of about 40 μm and then combined into a ribbon 4×4 array 106 with a separation of about 120 μm between the outermost core regions. A lens 107, such as a graded index rod lens, is used to image the array onto the end of a loopback fiber 108 having, e.g., a core diameter of 62.5 μm and an outer diameter of 125 μm.

Thus, turning back to FIG. 1, the loopback fiber is optically coupled both to star coupler 60 and to each of the bypass lines. As a result, a portion of each inbound transmission from ONUs 40 reaches the monitor via the star coupler, and a portion of each transmission (with the possible exception of one ONU, denoted "ONU1" in the figure) reaches the monitor via a bypass line. Significantly, a known time delay is associated with the transmission through each of the bypass lines, relative to the corresponding transmission through the star coupler. (The delay corresponding to ONU1, as represented in the figure, may be regarded as a zero delay.) Each delay is readily adjusted by means, e.g., of optical fiber delay lines 110. Optionally, one or more transmissions in the bypass lines can even be advanced relative to the transmissions through the star coupler, by adding a delay line between the star coupler and fiber 100.

It is well known that multimode fibers generally exhibit greater dispersion than single-mode fibers. This would militate against the use of a multimode fiber as a loopback fiber. However, loopback fiber 100 is relatively short (typically, 5 km or less), and is readily provided with a modest dispersion, e.g., about 1–4 ns/km. At such values, a multimode fiber is readily incorporated in the network without masking the features of the monitor pulse train. Furthermore, the use of a multimode fiber as a loopback fiber is very advantageous because optical coupling of the bypass lines to a multimode loopback fiber (but not to a single-mode fiber) is readily achieved through a multimode interface region such as coupler 95. If monitoring is carried out at the central office, it is advantageous (for reasons of economy) to carry the loopback fiber in the same cable as primary fiber 10. (Multimode fibers are practical to use even if the PON is upgraded to carry high bit-rate information such as HDTV or CATV from the central office to the ONUs. Even in that case, the ONUs will transmit back to the central office only relatively low bit-rate information, which the loopback fiber is designed to monitor.)

Figure 4:
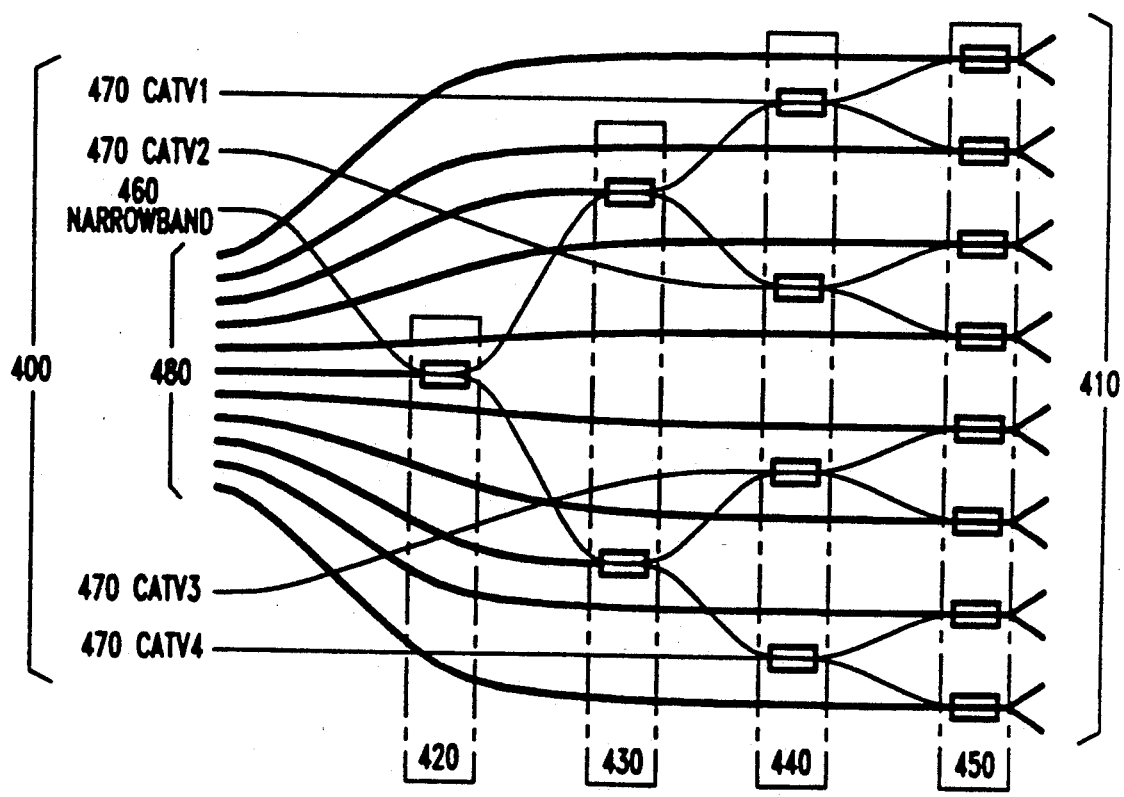
FIG. 4 is a schematic representation of an exemplary N×N optical coupler useful as an alternative to a star coupler in practicing the invention.

It should be noted in this regard that in theory, neglecting coupling losses, a fraction (N−1)/N of the total power in the distal ports of N×N star coupler 60 can be collected by the loopback fiber by using the N−1 proximal ports that are not connected to the central office. An alternative embodiment, which may be made as either a fused fiber or an SiOB component, is shown in FIG. 4. In that embodiment, sixteen proximal ports 400 are coupled to 16 distal ports 410 through four sequential stages of 2×2 couplers 420, 430, 440, 450.

A particular advantage of such an embodiment is that coupling losses can be reduced in high-bandwidth signals, which have a relatively low dynamic range. That is, four of the sixteen input fibers, carrying specified information (i.e., the fibers 470, denoted "CATV-1–CATV4" in the figure) can be coupled to the output fibers through only two of the four coupler stages, thus substantially reducing coupling loss. With respect to the four input fibers 470, the couplers stages 440 and 450 constitute four 1×4 combiners.

All sixteen input ports of the constituent 2×2 couplers are accessible at the proximal end of the component. A single input port 460 connects the central office to all of the output ports. As noted, four input ports 470 connect four CATV input signals through two coupler stages to the output fibers. The remaining eleven proximal ports, i.e., ports 480, are available for monitoring by interconnection with a loopback fiber.

The time delays in the bypass lines are useful for passively identifying faults in the network. That is, any of the ONUs may fail. Such failures are typically manifested by failure to transmit, by continuous (cw) rather than pulsed transmission, by random pulsing at times not prescribed by the protocol for that ONU, or by random pulsing in the guard band. It is conventional to employ active means to identify the ONU which has failed. Such active means typically involve complicated ONU transmitters which include a back-face monitor pulse detector and a protocol for communicating problems back to the central office. It is also typically required to shut down each ONU, in turn, in order to search for the fault. By contrast, the inventive network can be monitored for fault detection without interrupting service transmission. Monitoring is done by monitor 70 (as well as by analogous, additional monitors), which is typically located at the central office. The diagnostic signals used for ONU fault identification may be the ordinary transmissions by the ONUs and are not dependent on the system electronic protocol.

Each ONU transmission produces a main signal, which is received by the monitor via star coupler 60, and a ghost signal, which is received via a bypass line, after a time delay which is associated with a respective one of ONUs 40. (Of course a portion of each ONU transmission also goes to the central office via primary fiber 10. That portion represents the communication, as opposed to diagnostic, portion of the transmission.) Both the main signal and the ghost signal consist of trains of pulses. The ghost pulses appear only on the loopback fiber, and not on the primary fiber. By correlating the main and ghost signals, it is usually possible to identify individual ONUs. Accordingly, monitor 70 includes a signal correlator which is able to identify ghost signals which arrive at predetermined delays relative to the main signal.

If the ONUs are operating normally, both the main signal and the ghost signal have high signal-to-noise ratios (S/N). The main pulses are strong because multiple (typically, $N-1$) proximal ports of the star coupler feed into the loopback fiber, and thus a relatively large fraction of each ONU output fed into the star coupler is delivered to the loopback fiber. The ghost pulses are strong because each delayed signal is delivered to the loopback fiber with only coupling losses; i.e., because the delayed signal is not subdivided among multiple channels, it is free of distribution losses. The intensity of the ghost pulses may, in fact, exceed that of the pulses sent to the central office via fiber 10. In some cases, it may be necessary to attenuate the main pulses in order to optimize the detection capabilities of monitor 70. For example, it may be desirable to limit the intensity of the main pulses to once or twice the intensity of the ghost pulses. If such attenuation is desired, appropriate attenuation means are readily incorporated between the bypass lines and the loopback fiber, or between the distribution fibers and their corresponding bypass lines.

Figure 5:
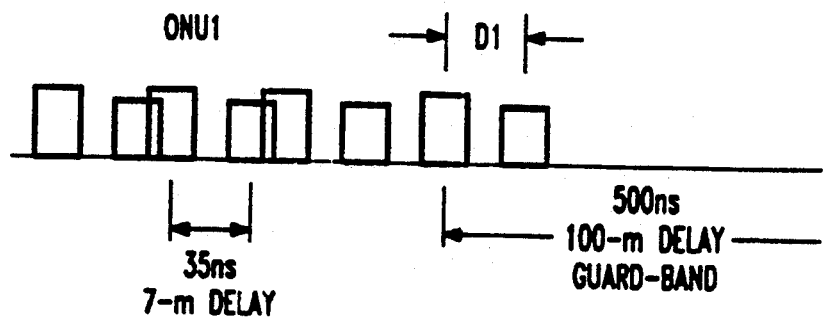
FIGS. 5–7 and 10 are representations of an exemplary monitor time base, showing possible relationships between received main pulses and received ghost pulses.
Figure 6:
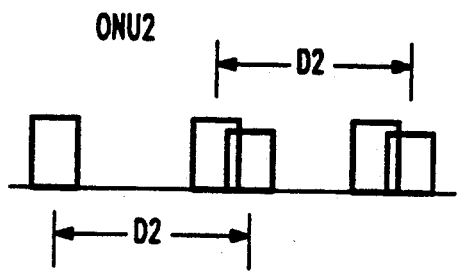
Figure 7:
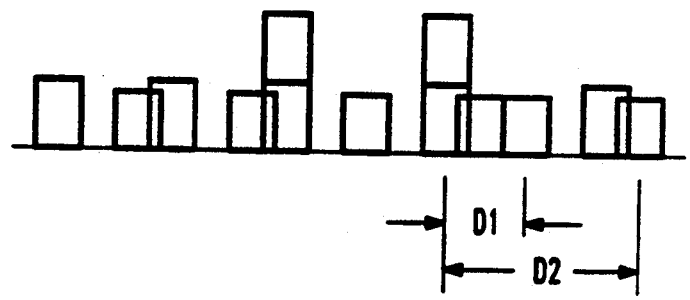

Shown in FIGS. 5 and 6 are portions of an exemplary time base of monitor 70. Portions of pulse trains from two ONUs, denoted ONU1 and ONU2 are visible, in, respectively, FIG. 5 and FIG. 6, together with corresponding ghost pulses. Shown in FIG. 7 is the same time base, with the pulse trains from the two ONUs overlapping. Correlations between main and ghost signals are readily detectable even in case of such overlapping of pulses.

Figure 8:
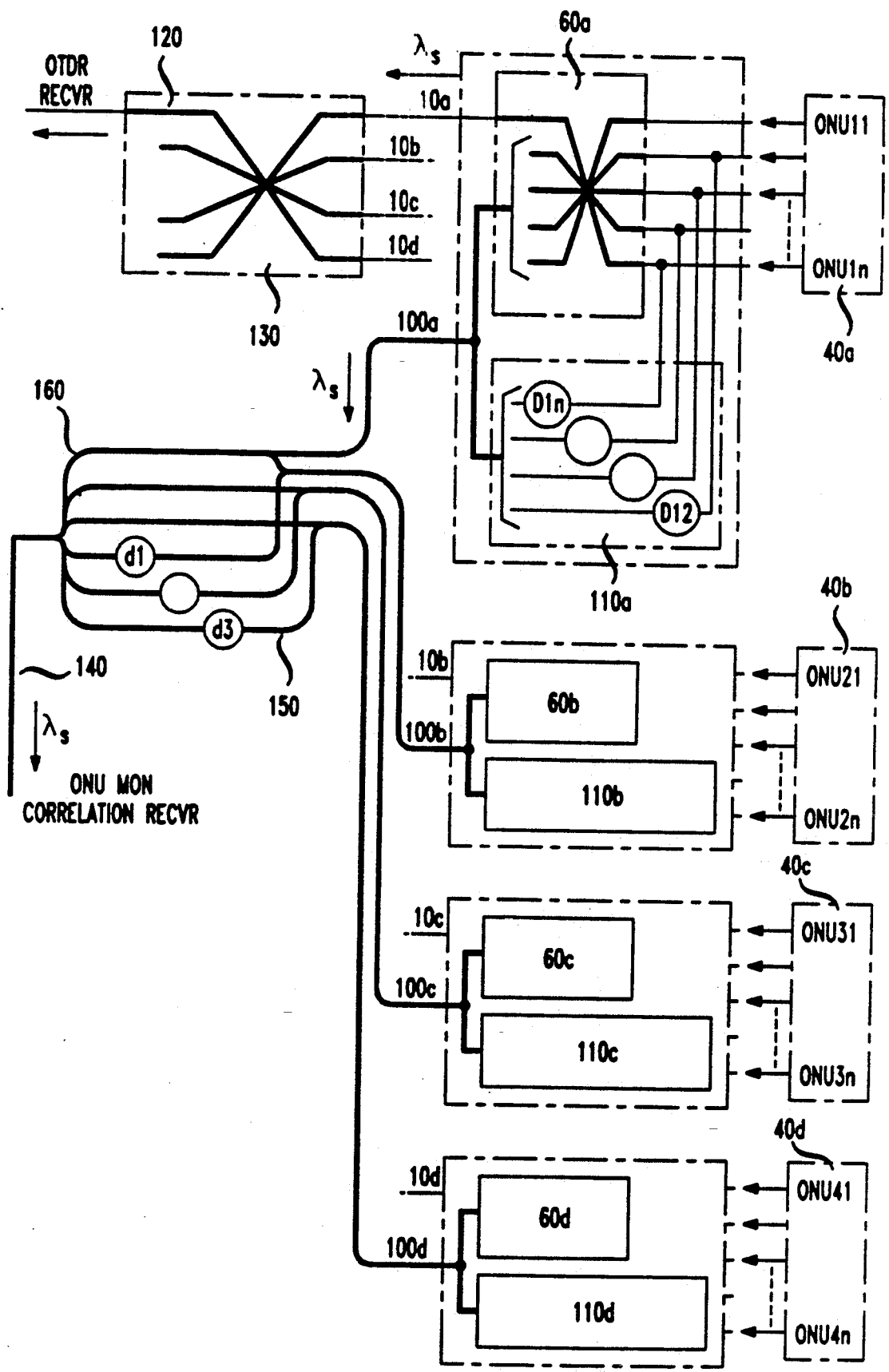
FIG. 8 is a schematic representation of the inventive network in a currently preferred embodiment which includes a Stage-2 coupler as well as multiple Stage-1 couplers.

In a currently preferred embodiment, depicted in FIG. 8, a single central office serves multiple primary fibers 10a–10d. (Multiplicities of four are shown in the figure for illustrative purposes only. The actual numbers to be used in practice are not limited by the depictions in the figures.) Bidirectional communication between the primary fibers and the central office takes place via a secondary fiber 120. Fiber 120 is also a single-mode optical fiber. Star coupler 130, referred to herein as a "Stage-2 star coupler", is provided to effect the optical coupling between the primary fibers and the secondary fiber. Each primary fiber is connected to a respective distal port of star coupler 130, and fiber 120 is connected to one of the proximal ports. As shown in the figure, at each of multiple distribution nodes, a primary fiber is optically coupled to a multiplicity of distribution nodes, a primary fiber is optically coupled to a multiplicity of distribution fibers (shown as corresponding to ONU multiplicities 40a–40d, respectively, in the figure) via a Stage-1 star coupler (shown as 60a–60d, respectively, in the figure). A multimode, Stage-1 loopback fiber (shown as 100a–100d, respectively, in the figure) is connected to at least one proximal port of each Stage-1 star coupler. Multiplicities of bypass lines (shown as 110a–110d, respectively, in the figure) are provided to couple portions of inbound transmissions from at least some of the distribution lines associated with each node into the corresponding Stage-1 loopback fiber. The arrangement of distribution fibers, Stage-1 star coupler, primary fiber, bypass lines, and Stage-1 loopback fiber corresponding to each node is described by FIG. 1 and the related discussion.

Figure 9:
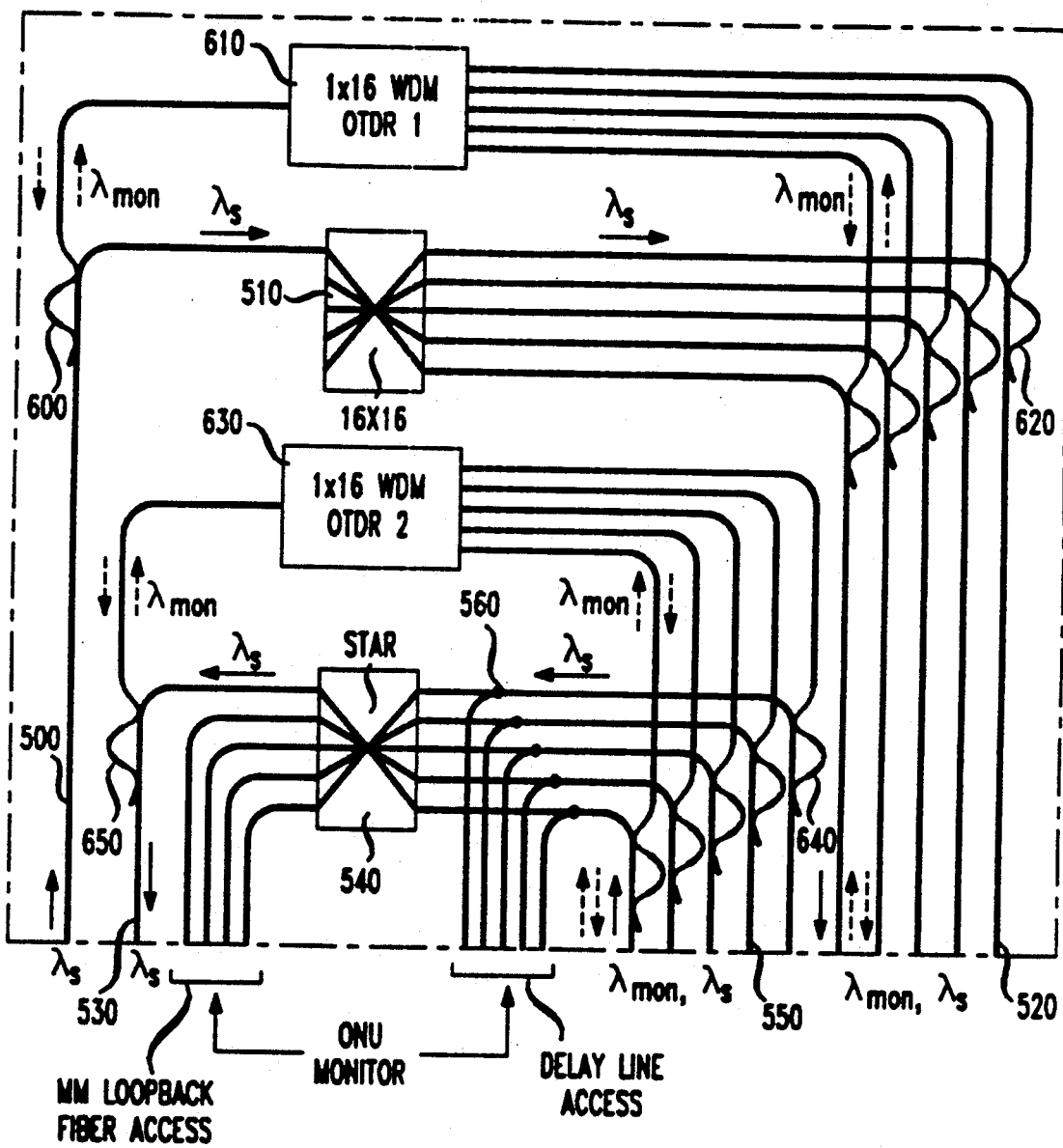
FIG. 9 is a schematic representation of a network architecture which involves unidirectional fibers, incorporates passive components for both OTDR monitoring and ONU monitoring, and can be implemented on a monolithic silicon optical bench platform.

An alternative architecture, shown in FIG. 9, may be used when there is only unidirectional transmission (on a given fiber) between the central office and the ONUs. In that case, there are separate passive optical networks for inbound and outbound communications. All of the optical splitters are preferably fabricated on a single SiOB chip, and corresponding inbound and outbound fibers are situated in the same cable. The ONU monitoring network is preferably housed with network components linking outbound communication fibers. The outbound network includes primary fiber 500 coupled to a proximal port of star coupler 510, and distribution fibers 520 coupled to distal ports of star coupler 510. The inbound network comprises primary fiber 530 coupled to a proximal port of star coupler 540, and distribution fibers 550 coupled to distal ports of star coupler 540. In the inbound network, 10-dB couplers 560 couple the distribution fibers to corresponding bypass lines, and the proximal ports of star coupler 540 unoccupied by primary fiber 530 are coupled to a multimode loopback fiber.

Referring back to FIG. 8, communication signals in a bidirectional architecture pass to and from the central office on secondary fiber 120. Diagnostic signals, however, are transmitted to the central office on multimode fiber 140, which is here referred to as a "Stage-2 loopback fiber." The proximal end of each of the Stage-1 loopback fibers (i.e., fibers 100a–100d of FIG. 8) is optically coupled to fiber 140. For example, the proximal ends of four or even more 625/125-μm multimode fibers are readily fixed in a two-dimensional array within a ferrule, and optically coupled, via a lens, into a single fiber having dimensions of, e.g., 62.5/125 μm, 80/125 μm, or 100/125 μm. Alternatively, a 1×4 fused-fiber coupler is readily used to combine the outputs of fibers 100a–100d.

In addition, a portion of the inbound transmissions on each (possibly excluding one, as shown in the figure) of the Stage-1 loopback fibers is diverted into the distal end of a corresponding Stage-2 bypass line 150. Each Stage-2 bypass line is a multimode fiber. The proximal ends of bypass lines 150 are optically coupled to fiber 140, e.g., at point 160, exemplarily by a 1×6 fused fiber coupler.

A known transmission delay is associated with each of the Stage-1 bypass lines, relative to transmissions that reach the Stage-1 loopback fiber via the corresponding Stage-1 star coupler. Similarly, a known transmission delay is associated with each of the Stage-2 bypass lines. As discussed above, such delays are readily adjusted by incorporating, e.g., a fiber optic delay line. By contrast, the optical coupling of the Stage-1 loopback fibers into the Stage-2 loopback fiber at, e.g., point 160 does not add substantial relative delays between transmissions from the respective Stage-1 loopback fibers.

The respective delays associated with, e.g., Stage-1 bypass lines 110a may be similar to, or even identical with, those associated with the other multiplicities of bypass lines. In order to assure that each delayed diagnostic signal reaches the monitor with a delay which is sufficiently unique to distinguish, e.g., line 100a transmissions from, e.g., line 100b transmissions, the delays in lines 150 are added onto the delays in lines 110a–110d.

Figure 10:
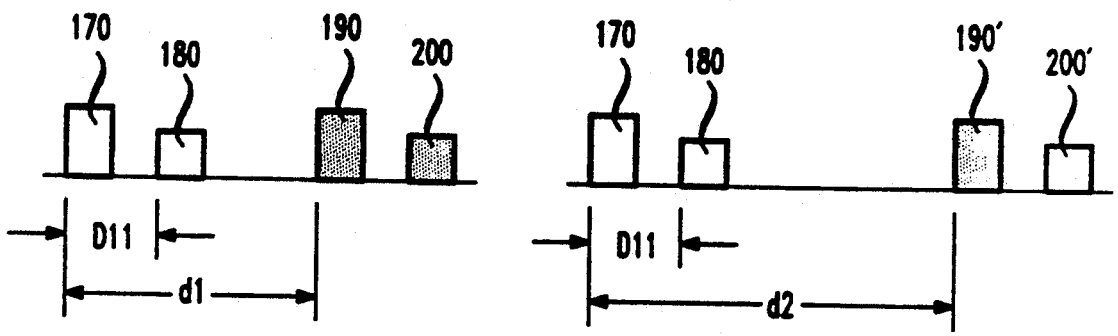

Shown in FIG. 10 is an exemplary monitor time base. Pulses from two distinct ONUs, denoted ONU21 (from multiplicity 40b of FIG. 8) and ONU31 (from multiplicity 40c) are shown. Pulses 170 are the main pulses. The same delay is introduced by each of the respective Stage-1 bypass lines, and thus at that stage, the same delay D11 is produced between each main pulse 170 and ghost pulse 180. However, distinct delays are produced by Stage-2 bypass lines 150. Thus, the inbound transmission from line 100b is delayed by an additional amount d1, producing, at the monitor, a singly delayed ghost pulse 190 and a doubly delayed ghost pulse 200. Similarly, the inbound transmission from line 100c is delayed by d2, producing singly delayed ghost pulse 190' and doubly delayed ghost pulse 200'. At least the doubly delayed pulses 200 and 200' are readily distinguished by unique delay times D11+d1, and D11+d2, respectively.

The above-described embodiments are useful for identifying faulty ONUs in an optical communication network. However, faults may also occur in the optical fibers of the network. For example, fibers may break and losses may change due to environmental conditions.

Figure 11:
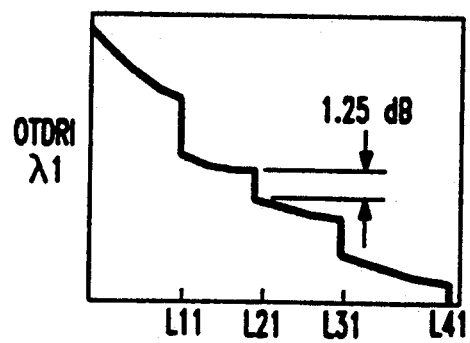
FIG. 11 depicts an illustrative OTDR monitor time base, exhibiting an edge-like feature which could indicate a break in a fiber.

One method for locating such faults is the use of optical time-domain reflectometry (OTDR). This method takes advantage of Rayleigh scattering in the optical network. Rayleigh scattering is an intrinsic loss effect that isotropically scatters a fraction of forward-propagating light over $4\pi$ steradians. In particular, some of the light is backscattered. In OTDR, a portion of the backscattered light, which is collected in the core of the fiber, produces inbound transmissions which are received at the central office and monitored over time. Because backscatter occurs more or less uniformly throughout the fibers of the network, each feature in the outbound transmission gives rise to a continuous smear of echoes, distributed at a continuous range of delays, each delay corresponding to an optical path length between the central office and the point where that echo originated. If a fiber is broken, then echoes which would originate at points distal the break are either substantially attenuated or nonexistent. A corresponding edge-like feature appears on the OTDR monitor time base, as shown, e.g., in FIG. 11.

Figure 12:
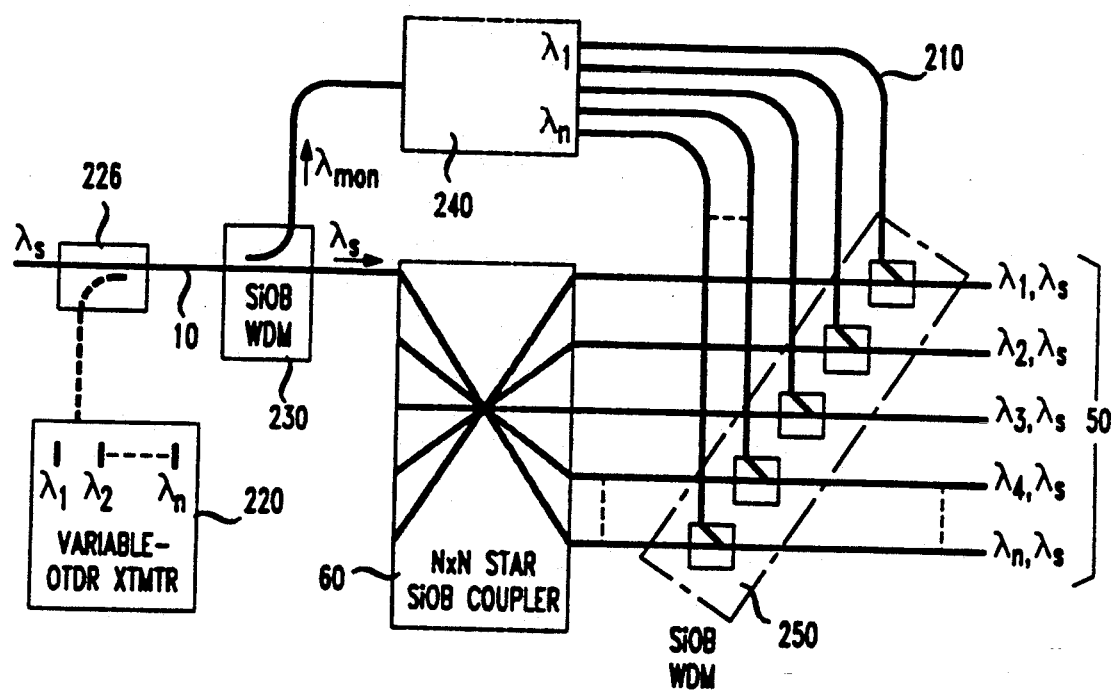
FIG. 12 is a schematic representation of the inventive network in an alternate embodiment adapted for OTDR monitoring in which the bypass lines are coupled to the distribution fibers via wavelength division multiplexers, and OTDR monitoring is done via the primary fiber.
Figure 13:
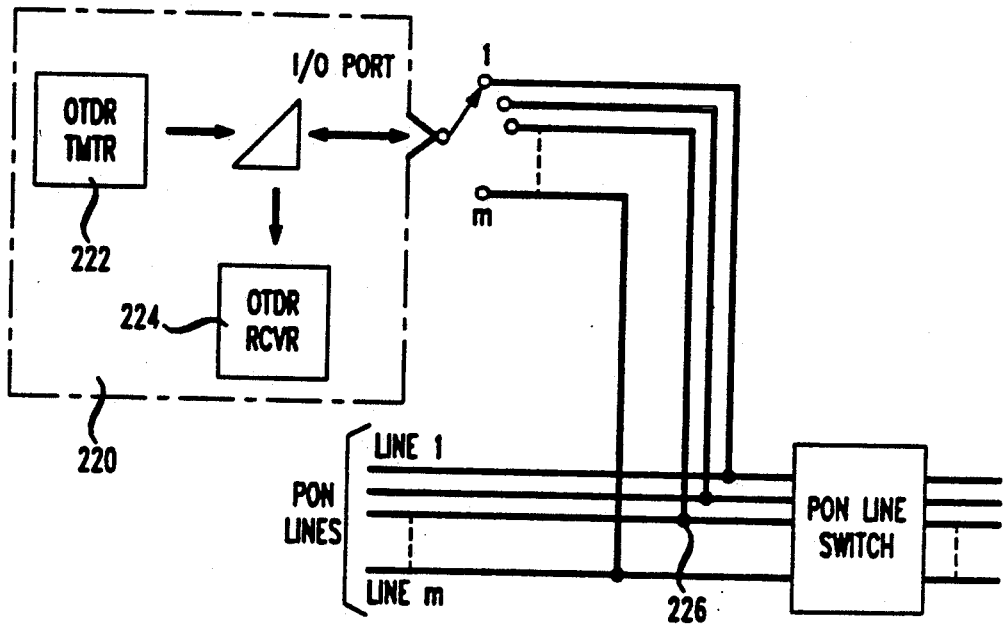
FIG. 13 is a schematic representation of an OTDR monitor and an electromechanical switch for connecting the monitor to one of a multiplicity of PON lines.

With reference to FIGS. 12 and 13, the OTDR monitor 220 is a single-port test instrument, comprising a transmitter 222 and a receiver 224, which is coupled into the optical network through a coarse wavelength-division multiplexer (WDM) 226 located at the central office. Backscattered light, returning from the test fiber, is diverted to the OTDR monitor through a beamsplitter or fused fiber coupler located on the OTDR I/O port. It is desirable to use the same OTDR monitoring equipment for each separate network emanating from the central office. Depicted in FIG. 13 is a 1×m electromechanical switch that may be used to switch the OTDR I/O port to any one of the course WDMs which provide input to the m respective networks.

The optical path length from the central office to the break is readily deduced from the delay that corresponds to this feature. Such a method is useful not only for locating fiber faults, but also for detecting loss changes in fibers, and monitoring losses at splices and connectors.

However, when multiple fibers fan out from a distribution node in the network, it is impossible, without further refinements, to identify which of the multiple distribution fibers has a break distal the node. Such a refinement is provided by our invention, in an alternate embodiment to be described below.

With further reference to FIGS. 12 and 13, the invention in one embodiment includes a primary fiber 10, a multiplicity of distribution fibers 50, and a Stage-1 star coupler 60, all interconnected substantially as described above. Also included is a multiplicity of bypass lines 210, each optically coupled at its distal end to one of the distribution fibers, and optically coupled at its proximal end to the primary fiber. From the central office, communication signals are transmitted along fiber 10 at the signal frequency, and from a variable-wavelength OTDR transmitter 222 (typically also located at the central office), diagnostic signals are transmitted along the same fiber at a multiplicity of monitor wavelengths, all of which are different from the signal wavelength.

The optical coupling between lines 10, 210, and 50 is arranged such that outbound transmissions at the signal wavelength pass into star coupler 60, but outbound monitor-wavelength transmissions do not. Instead, a spectrally discriminating component 230 diverts the monitor-wavelength transmissions into bypass lines 210. The monitor-wavelength transmissions are further subdivided such that a unique monitor wavelength, or wavelength range, is assigned to each of the bypass lines and corresponding distribution fibers. Such subdivision is exemplarily achieved by a second spectrally discriminating component 240. Each of components 230 and 240 is, exemplarily, a wavelength-division multiplexer (WDM). Relatively coarse wavelength resolution would suffice for component 230, since the spacing between the signal wavelength and the central monitor wavelength can be made substantially larger than the spacing between respective monitor wavelengths. Higher resolution is then required of component 240, in order to resolve the individual monitor wavelengths.

The distal end of each bypass line is optically coupled to the corresponding distribution fiber via another spectrally discriminating component 250, which is exemplarily yet another WDM. Components 250 admit inbound transmissions at the monitor wavelengths to the bypass lines, but prevent such transmissions from entering star coupler 60.

Figure 14:
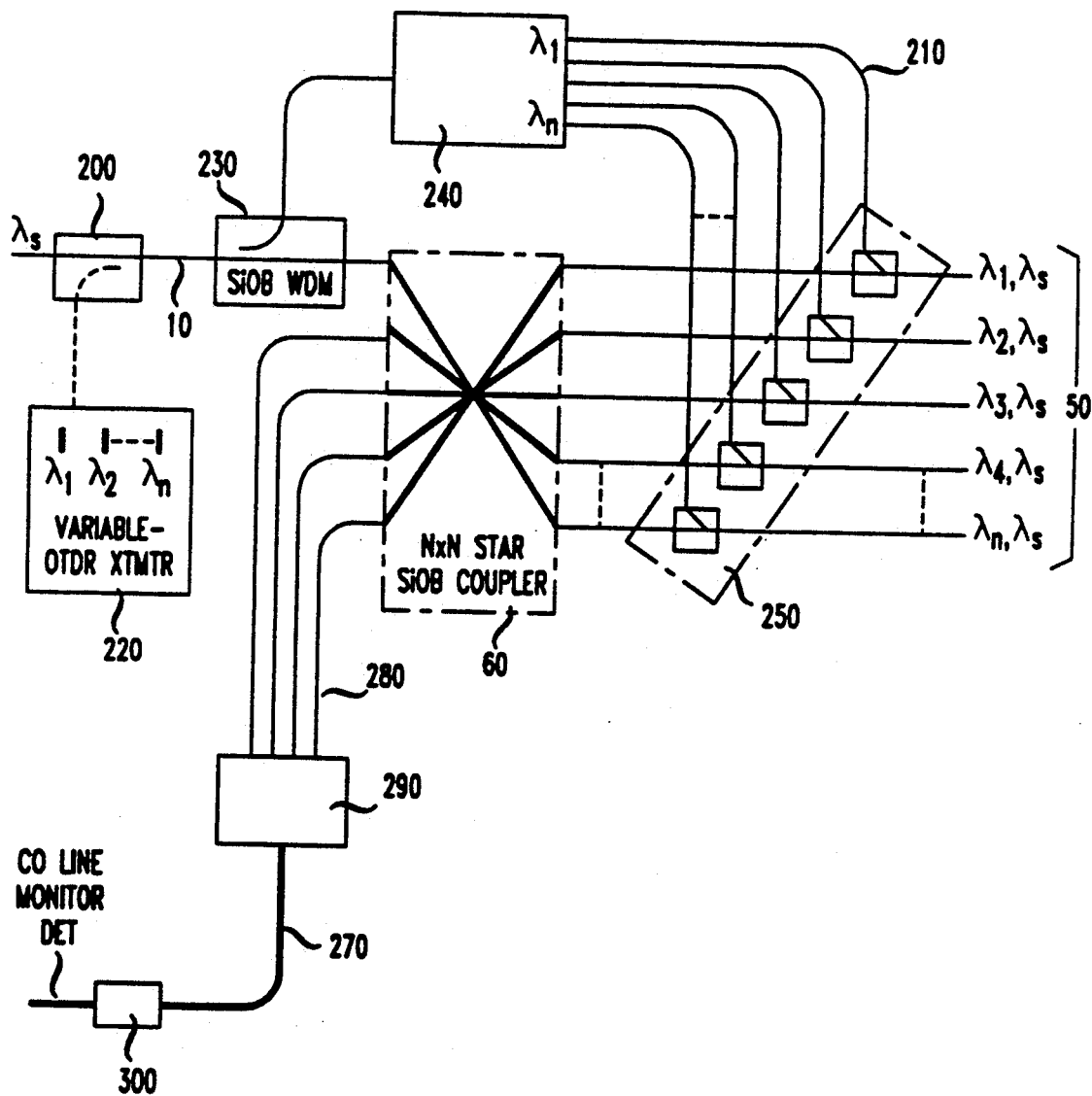
FIG. 14 is a schematic representation of the inventive network in an alternate embodiment adapted for OTDR monitoring in which the bypass lines are coupled to the distribution fibers via 5-dB couplers or similar components, and OTDR monitoring is done via a loopback fiber.

The arrangement described above permits each distribution fiber to be identified by a unique wavelength or wavelength range, while mitigating round-trip losses in the monitor transmissions by routing such transmissions around star coupler 60. The OTDR transmitter includes, e.g., one or more tunable lasers, or, alternatively, a series of discrete, narrow-line lasers coupled to fiber 10 via In an alternate embodiment, depicted in FIG. 14, components 250 are not spectrally discriminating, but are, exemplarily, 5-dB couplers. In order to maximize the inbound monitor transmission, that transmission is collected from at least some, and preferably all, of the proximal ports of star coupler 60 (exclusive of the port connected to fiber 10). Optically coupled to those ports is the distal end of multimode loopback fiber 270. Optical coupling is provided by, e.g., single-mode ribbon cable 280, which is connected to the star coupler, and single-to-multiple mode coupler 290, which optically couples the transmissions from the multiple fibers of the ribbon cable into multimode fiber 270. Fiber 270 carries the inbound monitor transmissions to the monitor via an optical filter 300, which removes the signal wavelength from the transmissions.

Figure 15:
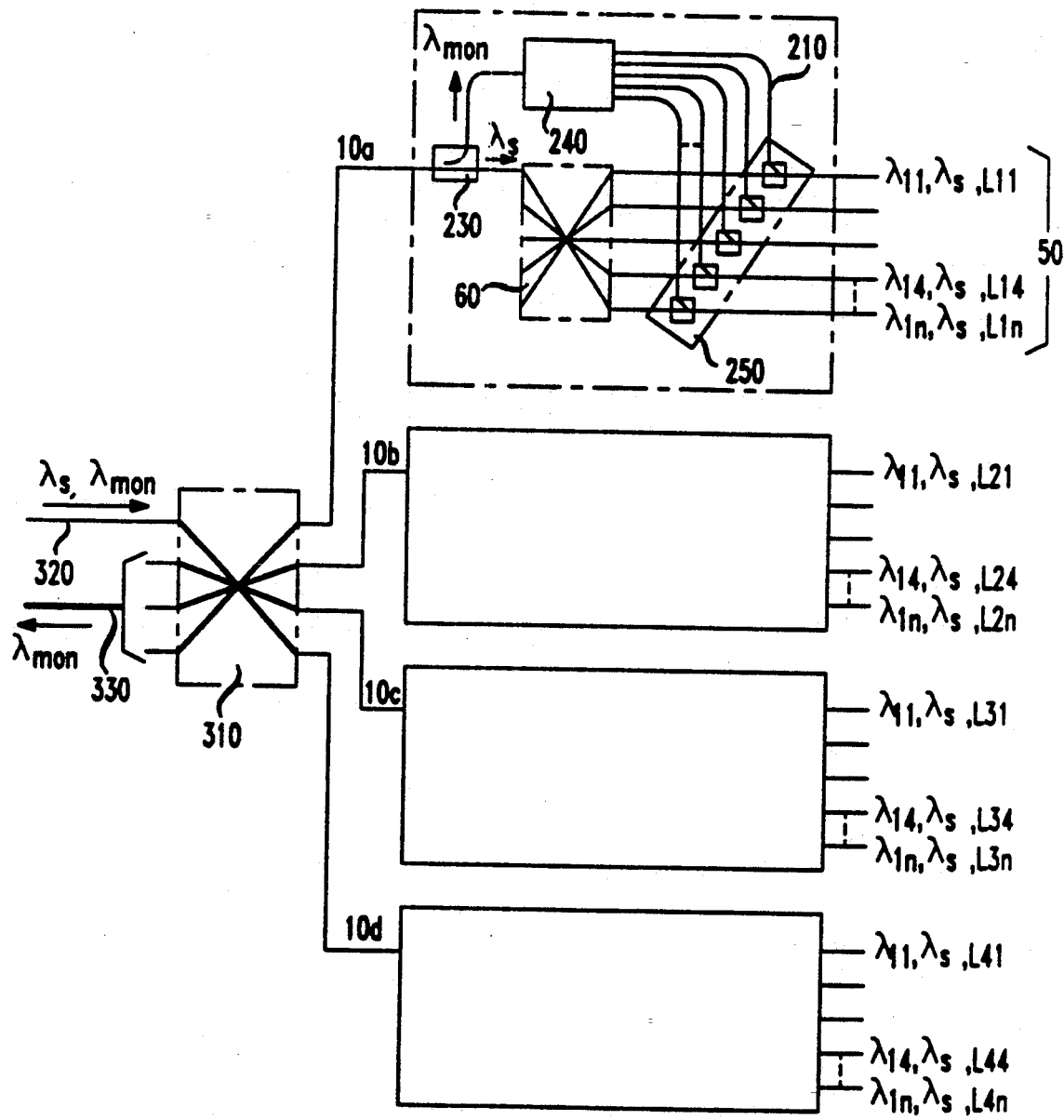
FIG. 15 is a schematic representation of the inventive network in an alternate embodiment adapted for OTDR monitoring, which includes a Stage-2 coupler and multiple Stage-1 couplers, and the same set of monitor wavelengths is assigned to each Stage-1 coupler.

In a preferred embodiment, there are multiple primary fibers, depicted in FIG. 15 as fibers 10a-10d. (Four such fibers are shown in the figure for illustrative purposes. The actual number of primary fibers is not limited by the figure, and, in fact, will more typically be sixteen.) The optical arrangement of FIG. 12, including distribution fibers 50, couplers 250, bypass lines 210, star coupler 60, and couplers 230 and 240 is repeated once for each of the multiple primary fibers. The proximal end of each primary fiber is optically coupled to the distal end of star coupler 310. Single-mode fiber 320, here referred to as a "secondary fiber" is provided for bidirectional transmission of communication signals at the signal wavelength, and for at least outbound transmission of diagnostic signals at multiple monitor wavelengths. Secondary fiber 320 is optically coupled to one of the proximal ports of star coupler 310. (Star coupler 310 is here referred to as a "Stage-2 star coupler.") Multimode fiber 330, here referred to as a "Stage-2 loopback fiber," is provided to carry inbound monitor wavelength transmission to the monitor. Fiber 330 is optically coupled to at least one, and preferably all, of the proximal ports of star coupler 310, exclusive of the port coupled to fiber 320.

In the arrangement of FIG. 15, the same multiplicity of monitor wavelengths (denoted in the figure by $\lambda_{11}, \ldots, \lambda_{1n}$ for each multiplicity 50 of n distribution fibers) is at least partially repeated for each multiplicity 50 of distribution fibers. Thus, for example, monitor wavelength $\lambda_{11}$ will be distributed into one distribution fiber from primary fiber 10a, and also into a corresponding distribution fiber from primary fiber 10b, etc. As a consequence of the redundant use of monitor wavelengths, further means are required to distinguish each distribution fiber from its counterparts that are associated with the same monitor wavelength. Such means are provided by the transmission delays associated with the different lengths of the respective distribution fibers.

That is, the transmission delay between each distribution fiber which carries a given monitor wavelength and the monitor is readily determinable, and is, or is readily made, sufficiently unique to be used for identifying the distribution fiber. In order to impose readily distinguishable delays, it is straightforward to add fiber optic delay lines to, e.g., any of bypass lines 210. The width $\Delta T$ of OTDR-transmitted pulses is equivalent to the minimum round-trip propagation time and propagation length $\Delta L$. (For example, a $\Delta T$ of 100 ns typically corresponds to a $\Delta L$ of about 10 meters.) Thus, the OTDR can be adapted to resolve loss changes within length increments of 10 meters or more by making $\Delta T$ equal to 100 ns or a proportionally greater value.

Figure 16:
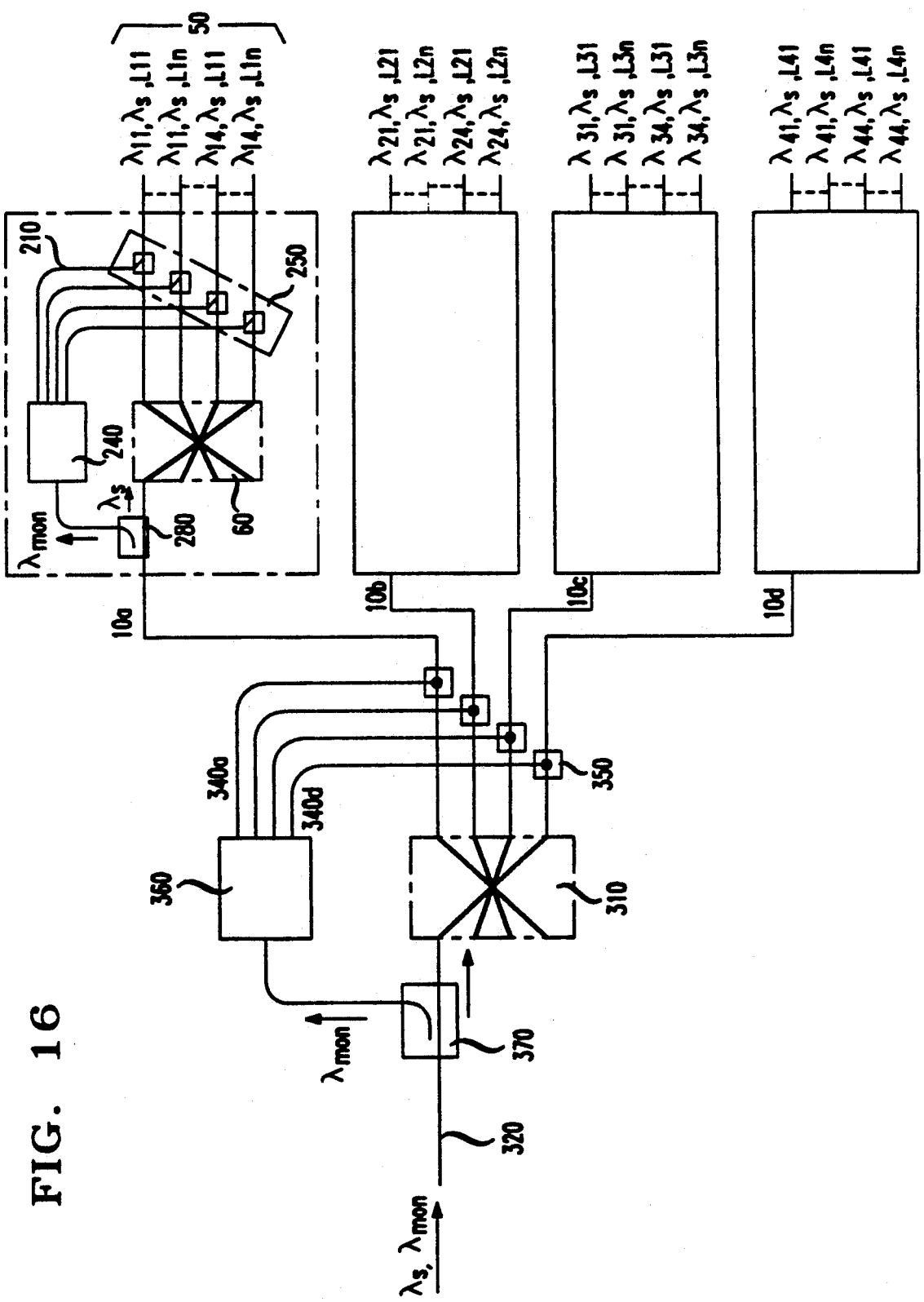
FIG. 16 is a schematic representation of the inventive network in an alternate embodiment adapted for OTDR monitoring, which includes a Stage-2 coupler and multiple Stage-1 couplers, and a different set of monitor wavelengths is assigned to each Stage-1 coupler.

The alternate embodiment of FIG. 16, like the embodiment of FIG. 15, includes repeated optical arrangements of the kind depicted in FIG. 12. However, loopback fiber 330 is omitted and, instead, the inbound monitor-wavelength transmissions are sent to the central office on single-mode, secondary fiber 320. As in the preceding embodiment, signal-wavelength transmissions are coupled via star coupler 310 between the primary and secondary fibers. However, unlike the preceding example, the monitor-wavelength transmissions are routed around the star coupler via a multiplicity of bypass lines, one for each primary fiber. (In the figure, the bypass lines are denoted 340a-340d. Four bypass lines are depicted for illustrative purposes only; the depiction in the figure is not intended to limit the number that may be used. More typically, there will be sixteen primary fibers and sixteen bypass lines.) Bypass lines 340a-340d are here referred to as "Stage-2 bypass lines."

The optical coupling between bypass lines 340a-340d and the primary and secondary fibers is similar to the optical coupling described by FIG. 12 and the related discussion. That is, the distal end of each bypass line is optically coupled to the associated primary fiber via a spectrally discriminating component 350, exemplarily a WDM, which admits inbound signal-wavelength transmissions to star coupler 310, but routes inbound monitor-wavelength transmissions into the bypass line. Spectrally discriminating components 360 and 370 are provided to admit outbound signal-wavelength transmissions to star coupler 310, but to route outbound monitor-wavelength transmissions through the bypass lines. Component 360 is further provided in order to subdivide the monitor-wavelength transmissions and distribute them into selected primary fibers according to wavelength. Each of components 360 and 370 is, exemplarily, a wavelength-division multiplexer (WDM). Relatively coarse wavelength resolution suffices for component 370, and higher resolution is generally required of component 360.

According to the embodiment of FIG. 16, a set of distinct monitor wavelengths is associated with each of the primary fibers and the corresponding distribution fibers. Wavelengths sets corresponding to different primary fibers are disjoint; that is, no two primary fibers have any associated monitor wavelengths in common. Each wavelength set consists of at least one wavelength, but will more typically consist of four wavelengths. That is, each primary fiber will typically be associated with sixteen distribution fibers. The distribution fibers will typically be divided into four groupings of four fibers each. A unique monitor wavelength will be associated with each such grouping. Thus, all four fibers within a grouping will share the same monitor wavelength.

Because all four fibers within a grouping will typically share the same monitor wavelength, additional means must be provided for distinguishing the fibers within a grouping. Transmission delays provide a ready solution to the problem. If inherent differences in transmission time are not sufficient, fiber optic delay lines, for example, are readily added to any of the Stage-1 bypass lines in order to provide adequately distinguishable delays.

Referring back to FIG. 9, an OTDR monitoring network is readily made in which the optical fibers are used for unidirectional transmission only, and must therefore occur in pairs of PONS for purposes of bidirectional transmission. Moreover, such a network is readily integrated with an ONU-monitoring network and the passive components of such an integrated network are readily fabricated on, e.g., a SiOB chip.

With further reference to FIG. 9, transmissions at the signal wavelength $\lambda_s$ outbound from the central office are transmitted from primary fiber 500 through star coupler 510. Inbound transmissions from the ONUs at $\lambda_s$ are transmitted from star coupler 540 to primary fiber 530. Transmissions at monitor wavelengths $\lambda_{mon}$ (indicated by dashed arrows in the figure) propagate bidirectionally in each PON. OTDR transmission is toward the ONUs, and backscattered signals from the fiber media return toward the central office. In an exemplary diagnostic procedure, OTDR transmissions are made one monitor wavelength at a time, and an electromechanical switch is used to select the PON that is to be monitored.

According to the network of FIG. 9, coarse WDMs 600 and 650 respectively divert outbound monitor-wavelength transmissions from primary fibers 500 and 530 into WDMs 610 and 630. WDMs 610 and 630 respectively distribute the transmissions, according to their respective monitor wavelengths, into distribution fibers 520 via coarse WDMs 620, and into distribution fibers 550 via coarse WDMs 640. Conversely, inbound WDM transmissions that have been backscattered from the distribution fibers are coupled from inbound distribution fibers 550 into WDM 630 via coarse WDMs 640, and from outbound distribution fibers 520 into WDM 610 via coarse WDMs 620. The respective single-wavelength OTDR transmissions are combined by WDM 630 and coupled into inbound primary fiber 530 via coarse WDM 650, and combined by WDM 610 and coupled into outbound primary fiber 500 via coarse WDM 600.

As noted, the output of monitor detector 70 can be used to identify problems at the ONU transmitters, and even to identify individual ONUs that are malfunctioning. Possible malfunctions include anomalously low transmission power, intermittent transmission at the wrong time (sometimes referred to as "random" transmission), and continuous (i.e., cw) transmission.

Figure 17:
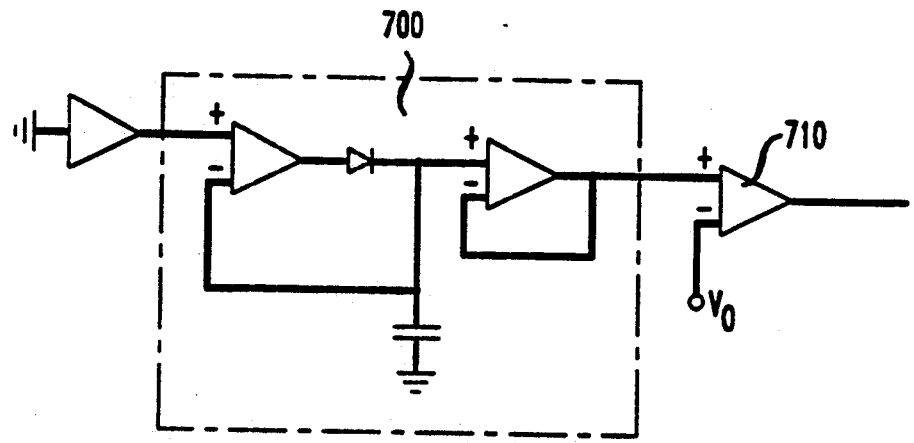
FIG. 17 is a schematic representation of an illustrative circuit for detecting low received power from the ONUs.

Monitoring of the ONU laser power at the central office involves two operations, namely, detection of low power in received signals, and tracking of such low power. Depicted in FIG. 17 is an exemplary circuit for low power detection. To detect low signal power, the output of the monitor detector is exemplarily fed to peak detector 700, and the peak detector output is compared to an appropriately selected threshold voltage level at, e.g., comparator 710. If the threshold is never exceeded during the time slot assigned to a given ONU, then a low-power alarm is activated; i.e., the state of an alarm line goes "high." In the figure, $V_0$ denotes the low-power threshold voltage. Because the time slot of each ONU is known, a priori, at the central office, it is not necessary to resort to the delay lines in order to identify a given ONU, at this stage of the diagnostic operations. However, the delayed signals must be considered in setting $V_0$, since the signals received at the central office will generally include ghost pulses which are additively superimposed upon signal pulses.

The probability of false alarm and the probability of "miss" (i.e., failure to detect a low power transmitter), when a single time slot is monitored, are readily estimated. Assume, for example, that there are 400 bits in a time slot, and transmitted "1"s and "0"s are equally probable. Then approximately one-fourth of the bit durations within the time slot, e.g., about 100 bit durations, will contain both signal and ghosted "1"s. The corresponding probability of false alarm is approximately given by $$P_{fa} = (1 - 0.5 \text{erfc}(2(V_0 - 1)(1 + \alpha) \sqrt{S/N}))^{100}, \quad (1)$$

where $\alpha$ is the ratio of the amplitude of the ghosted pulses to the signal pulses, S is the signal level, and S/N is the signal-to-noise ratio. For example, if S/N=8 dB, $\alpha=0.5$, and $P_{fa}=10^{-10}$, the threshold level should be set at $V_0 \approx 1.08 \sqrt{S}(1+\alpha)$. The probability of missing a low power level that falls $\Delta$ below the required level is approximately $$P_{miss} = 100(0.5 \text{erfc}(2(V_0 - 1 - \Delta)(1 + \alpha) \sqrt{S/N})). \quad (2)$$

Thus, for the preceding example, the probability of missing a level 1 dB below the required level is approximately $10^{-2}$. Of course, this will decrease with repeated time slots. That is, after m time slots, the probability will decrease to $P_{miss}^m$.

By tracking the received power levels, it is possible to determine the point in time when a given ONU transmitter begins to fail. In addition, since the received signal power levels from different ONUs can vary widely due to variations in transmission power and attenuation in fibers of varying lengths, the received power levels can also help to identify the ONUs that transmit at the wrong time. Signal power levels are readily tracked using, e.g., the peak detector of FIG. 17, followed by an analog-to-digital converter. The signal level for each ONU is stored in a digital memory for later reference.

Random and cw transmissions are readily detected using a peak-detector circuit such as the circuit of FIG. 17. During each time slot, the threshold should be set slightly higher than the signal (plus ghost and noise) level for the correct signal corresponding to that time slot, and in the guard band, the threshold should be set slightly higher than the noise level. The alarm line will be activated by the occurrence of a transmission at the wrong time, since the additive superposition of such a transmission will result in a peak which exceeds the threshold. The probability of false alarm for each bit is $$P_{fa} = erfc(2V_1 \sqrt{S/N_{min}}), \quad (3)$$

where $S/N_{min}$ is the signal-to-noise ratio for the minimum-power received signal, and $V_1, 0 \leq V_1 \leq 1$, is the threshold voltage normalized to $S/N_{min}$ in the guard band. During the relevant time slot, $V_1$ is augmented by $(1+\alpha)\sqrt{S/N}$ times the correct signal level. The probability of miss is then $$P_{miss} = .5 erfc(2(1 - V_1) \sqrt{S/N_{min}}). \quad (4)$$

There are several ways to identify the randomly transmitting ONU. If the transmitted signal levels are all distinguishable, the output of the peak detector over a time slot or guard band can be used to identify the ONU. Even if the ONU levels are not all distinguishable, the peak level can still be useful in limiting the possible faulty ONUs. Electrical signal processing techniques, described below, can then be used to identify the faulty ONU from its ghosted signal.

That is, the output of the monitor detector is readily divided into a pair of channels, and one channel is delayed, by a variable amount, relative to the other channel. The delayed and undelayed channels are correlated. Normally, in each time slot, the delay which gives the maximum correlation is the delay which has been established between the ONU signal assigned to that time slot and the corresponding ghosted signal. However, in case of a malfunction, a large correlation will also occur at a different delay (corresponding to the faulty ONU).

Figure 18:
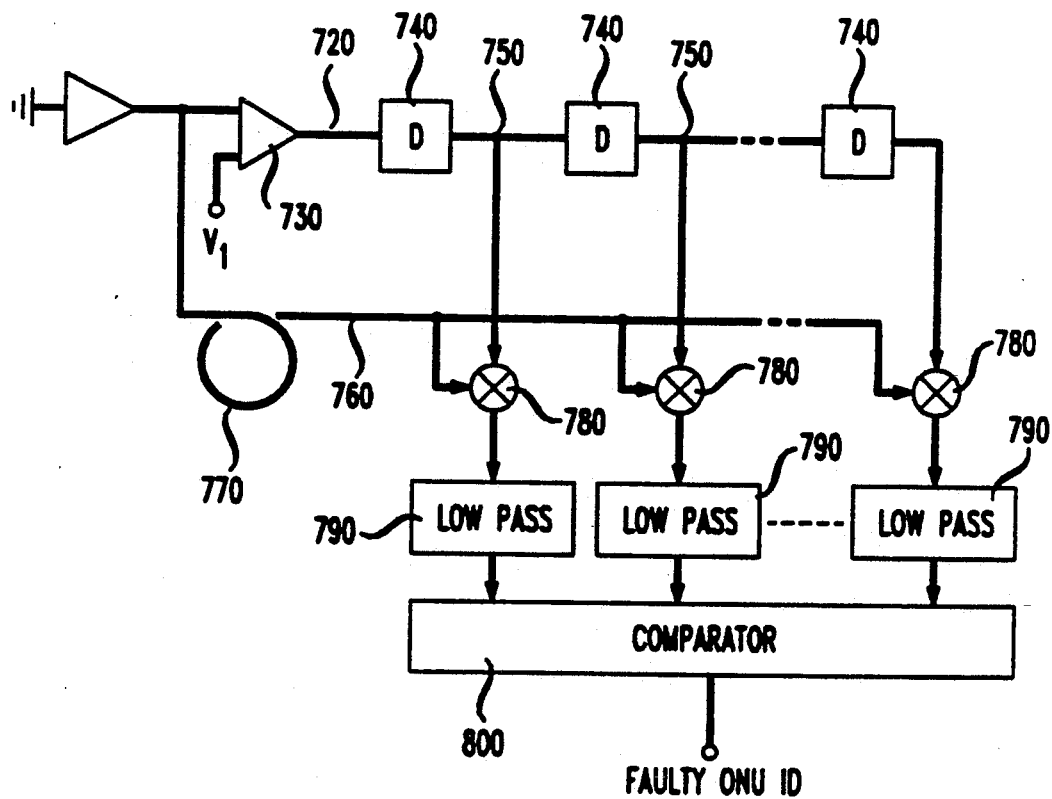
FIG. 18 is a schematic representation of an illustrative circuit for detecting a faulty ONU which is transmitting at random intervals.

FIG. 18 shows an exemplary circuit for practicing this technique. In line 720, the monitor output signal is processed by threshold detector 730 to determine the received bits. The threshold $V_1$ may be set at slightly below the "1" level. The bit stream in line 720 is then delayed in each of N successive shift registers 740. As a result, the bit stream at the nth node 750 is delayed by $D_n$ seconds, where, e.g., $D_n = nd$, $n = 1, \ldots, N$, and d is the delay per shift register. The monitor output signal is also fed into line 760, which has an optional, fixed delay 770. The signal in line 760 is correlated with the signal in line 720 by using switches 780. In each switch, the signal from line 720, at a particular delay, is used to gate the signal from line 760 into a low-pass filter 790. The time constant of each of filters 790 is typically selected such that the output of the filter represents an effective correlation integral evaluated over about one time slot, i.e., over 400-800 bit periods. At typical bit rates, the time constant is less than about 1 ms. The correlation levels, represented by the respective filter outputs, are compared in comparator 800 in order to determine the delay at which the maximum correlation occurs, excluding the delay corresponding to the correct ONU and any ONUs eliminated by power monitoring (i.e., only delays for the possible faulty ONUs are considered).

We expect that the above-described method will be very reliable, i.e., $P_{fa}$ and $P_{miss}$ will be negligible, when correlations are taken over 100 or more bits. However, although it is unlikely, high correlations in the data produced by properly functioning ONUs may interfere with the fault detection, and unacceptably degrade the reliability. In such cases, more complex signal processing techniques, not based on correlations, can be used. One such technique is described below, in connection with the diagnosis of cw-mode failures.

As noted, one failure mode results in cw ONU transmission. Correlation techniques are not useful for diagnosing such failures, because the cw-mode failure of, e.g., the ith ONU will result, $D_i$ seconds later, in a constant-amplitude signal in the monitor output, representing the sum of the cw signal and its ghost. However, if the power level of the faulty ONU is distinguishable from that of the correct ONU (in the time slot where the faulty ONU commences cw transmission) we can identify the faulty ONU with the use of a peak detector, as described above in connection with power monitoring. Even if the ONU levels are not all distinguishable, the peak level can still be useful in limiting the possibly faulty ONUs.

If power monitoring fails to identify the faulty ONU, it is necessary to identify the beginning of the cw transmission and the beginning of the cw ghost, without the use of correlation techniques. As noted, the monitor detector output in each time slot is normally an additive sum of main signal pulses and ghost signal pulses. The expected ghost signal is the main signal, delayed by the delay associated with that time slot, and appropriately attenuated. Normally, if the expected ghost signal is subtracted from the bit stream, only signal levels of approximately "0" and "1" will remain. However, if a cw transmission is present, anomalous signal levels will be observed. Specifically, if the faulty ONU has a different received power than the correct ONU, the level of the first anomalous signal level in the received signal will limit the possible faulty ONUs. The faulty ONU can then be identified by the delay for which the next anomalous signal level occurs (different from the first), caused by the ghosted signal. This technique can easily identify the faulty ONU except for the case where the faulty ONU has approximately the same received signal level as the correct ONU. In this instance, a single anomalous signal level will be observed for a short time, and the faulty ONU can be identified as described below.

Figure 19:
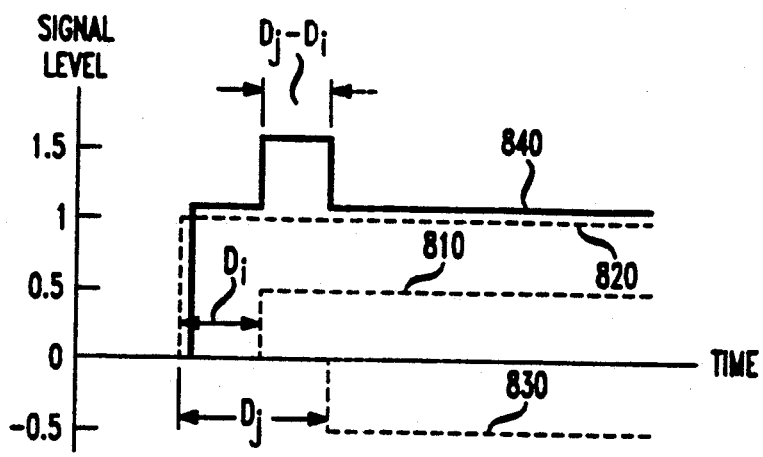
FIGS. 19 and 20 are graphs of voltage versus time, which illustrate the operation of a circuit for detecting a faulty ONU which is transmitting continuously.
Figure 20:
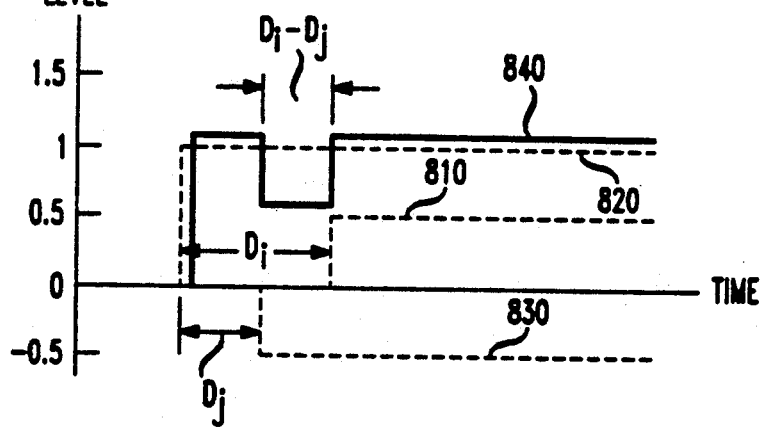

Two cases will now be separately illustrated. In Case 1, illustrated in FIG. 19, the ghost signal 810 from the faulty ONU (referred to, illustratively, as the ith ONU) has a delay which is smaller than the delay associated with the time slot being observed (which is assigned, illustratively, to the jth ONU). Consequently, a portion of signal 810 is added to main signal 820 before the subtraction of expected ghost signal 830 begins. In Case 2, illustrated in FIG. 20, the ith delay is greater than the jth delay, and as a result, the subtraction of signal 830 commences before the addition of signal 810.

In the first case, for a duration of $D_j - D_i$, the ghost of the cw signal will be present in the total, post-processing signal 840. In the second case, for a duration of $D_i - D_j$, a deficit appears in the portion of signal 840 attributable to the cw main signal before the onset of the cw ghost. (It should be noted, with reference to FIGS. 19 and 20, that data from the correct ONU can add the "1" level to the signal levels shown.)

Thus, if $\alpha = 0.5$, the duration of the signal level at 0.5, 1.5, or 2.5 times the "1" level determines the faulty ONU, or at worst, limits it to one of two possibilities. If this ambiguity is a problem, a different value of $\alpha$ (e.g., 0.75) can be used to distinguish the two cases. That is, since the anomalous levels are $1+\alpha$ and $2+\alpha$ (with a "1" for the data of the correct ONU) for Case 1, and 1−α and 2−α for Case 2, the signal levels for the two cases are distinguishable if 1+α≠2−α; e.g., if α=0.75.

Figure 21:
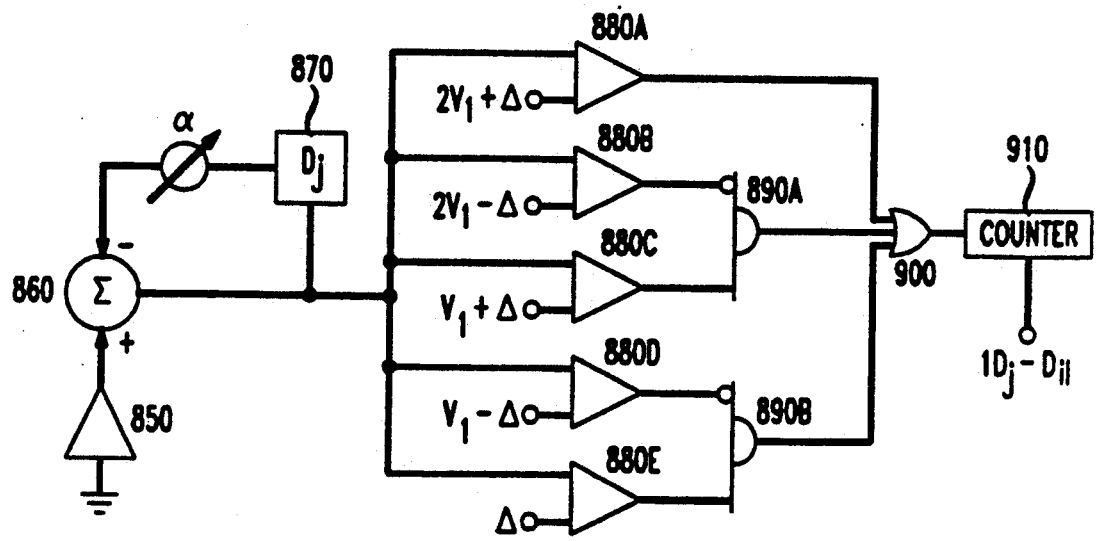
FIG. 21 is a schematic representation of an illustrative circuit for detecting a faulty ONU which is transmitting continuously.

FIG. 21 shows circuitry to implement the technique. In the figure, $V_1$ is the signal level for a "1", and Δ is set to give a low false alarm rate $P_{fa}$ for a given $S/N_{min}$. Because the correct identification of the faulty ONU requires correct level decisions, $P_{miss}$ is approximately the same as expressed in Equation (4). Thus, a cw-transmitting ONU is more difficult to identify than a randomly pulsing ONU. As shown in the figure, the output of monitor detector 850 is fed to adder 860, where the adder output, delayed by $D_j$ in shift register 870 and attenuated by α, is subtracted. The adder output is fed, in parallel, into comparators 880A–880E. The comparator outputs are coupled to the inputs of AND gates 890A and 890B and OR gate 900 such that the output of the OR gate will go high if the adder output is above twice the "1" range, between the "1" range and twice the "1" range, or between the "0" and the "1" ranges. Counter 910, clocked at the data rate, determines the duration of the anomalous signal level, which is $|D_j - D_i|$.

The techniques described above are readily extended to treat more complicated diagnostic problems. For example, the correlation technique of FIG. 18, discussed above as a method for identifying a single, randomly pulsing ONU, is also readily used to identify multiple randomly pulsing ONUs. Each faulty ONU will contribute a large correlation at a specific delay time. Moreover, the peak detector of FIG. 17 will generally indicate the presence of more than one faulty ONU.

The technique of FIG. 21 can be used to identify multiple faulty ONUs with cw transmission, although there is a possibility that such identification will be inaccurate unless the faulty ONUs have distinguishable power levels. However, to confuse the cw-mode failure identification, two ONUs would have to commence cw transmission within a few bit periods of each other, i.e., within an interval which is typically less than one microsecond for a 16-ONU system. Such a coincidence is very improbable.

A peak detector can be used to monitor received signal power even when the passive optical network includes concatenated splitters, as depicted, e.g., in FIG. 10. In such a network, it will generally be possible to identify faulty ONUs, or at least to limit the number of suspect ONUs, based on their received power levels. The correlation techniques of FIG. 18 are readily used to identify randomly pulsing ONUs in a concatenated network. In such a case, however, each ONU will have not one, but three correlation peaks, corresponding to the delay in each of two splitters. If, for example, α=0.5, the third correlation peak will be about one-half the magnitude of the first.

The technique of FIG. 21 can be extended in order to detect cw-transmitting ONUs in a concatenated network. However, the processing steps and the circuitry will be more complex than those illustrated in the figure.

EXAMPLE

FIG. 9 shows the architecture for a single SiOB platform capable of supporting a PON in which a unidirectional, outbound, primary fiber 500 and a unidirectional, inbound, primary fiber 530 serve sixteen ONUs. (A simpler analog of this architecture, using bidirectional fibers, is readily apparent.) Except for the delay lines, all passive components needed for signal distribution, ONU monitoring, and OTDR monitoring are integrated on a single silicon wafer, typically 12 cm in diameter. Such a chip is typically housed within an enclosure situated in the field, e.g., at a curbside location. Delay lines are typically formed as lengths of optical fiber which are coupled to access points on the chip, because spatial constraints militate against integrating them as waveguides on the chip.

Designs of SiOB passive devices, useful in this context, have been published. For example, a 19×19 star coupler has been reported in C. Dragone, et al., "Efficient Multichannel Integrated Optics Star Coupler on Silicon," *IEEE Photon. Tech. Lett.* 1, (Aug. 1989) 241–243. Similarly, WDMs are reported in C. Dragone, "An N×N Optical Multiplexer Using a Planar Arrangement of Two Star Couplers," *IEEE Photon. Tech. Lett.* 3, (September 1991) 812–815, and in C. Dragone, et al., "Integrated Optics N×N Multiplexer on Silicon," *IEEE Photon. Tech. Lett.* 3, (October 1991) 896–899.

On the SiOB chip, the spacing between waveguides is typically in the range 0.25–1.0 mm. The radius of curvature of waveguides is typically 5–10 mm. Waveguide crossovers can be made having very low cross-talk (i.e., less than −45 dB) and very low insertion loss (i.e., less than −0.05 dB) if the waveguide crossover angle is greater than 15°.

The waveguide loss is typically 0.02 dB/cm. The WDM channel spacing is typically 2 nm. The temperature shift Δλ of the WDMs is typically about 0.014 nm/°C. Such values of Δλ assure good environmental performance under field conditions. Moreover, active feedback can be employed at the central office in order to tune the OTDR monitor wavelengths to the centers of the WDM channels if the backscattered signals suffer excessive loss due to detuning.

The monitor wavelengths $\lambda_{mon}$ typically lie within nontelecommunication bands such as 1430 nm–1460 nm, or at wavelengths greater than 1560 nm. The pulsed OTDR transmitter is, exemplarily, a DBR (distributed Bragg reflector) laser, having a tuning range of about 8–10 nm.

The peak pulse power of the laser can be increased by as much as 11 dB, up to a maximum of about 150 mW, by integrating it with a semiconductor optical amplifier. Nonlinear back-scattering due to stimulated Brillouin effects (SBS) will not pose a problem since the high optical power is concentrated in individual narrow pulses at relatively low repetition-rates. The power threshold for SBS is $$P_{th} \approx \frac{21 A_{eff}}{GL_{eff}},$$

where $G = 2 \times 10^{-9}$ cm/watt, $A_{eff}$ is the core area, and $L_{eff}$ is the nonlinear effective length.

For example, at a 100-ns pulse width (which implies that $L_{eff} = 20$ m) and with $A_{eff} = 50$ μm², $P_{th}$ is approximately 2.6 watts. This threshold value is substantially larger than the peak OTDR pulse power.

The optical loss budget has been calculated for a 1×16 PON as described above. The loss budget is summarized in Table 1. By way of explanation, the losses tabulated in the second and third columns of the table are the losses in excess of the signal loss in a PON without a monitoring system.

TABLE 1

| COMPONENT | Δ SIG | ONU Δ SIG | ONU Δ GHOST | OTDR RT |
|---|---|---|---|---|
| Electromechanical switch | — | — | — | 1.0 |
| Coarse WDM (OTDR access) | 0.6 | — | — | 1.2 |
| Coarse WDM (coupler bypass) | 0.6 | — | — | 1.2 |
| SiOB Dense WDM | — | — | — | 5.0 |
| Coarse WDM (SiOB) (OTDR access) | 0.6 | 0.6 | 0.6 | 1.2 |
| Coarse WDM (Fi-end filter) (recvr pigtail reflector) | 0.5 | — | — | — |
| 10 dB coupler (SiOB) (delay line access) | 0.75 | 0.75 | 10.0 | — |
| 16 × 16 Star Coupler | — | −15.0$^{(1)}$ | −15.0$^{(2)}$ | — |
| 16 SM → 1 MM (delay line interconnect) | — | 5.0 | 2.0 | — |
| 2 × 1 MM fiber combiner (connect loopback fiber) | — | 3.0 | 3.0 | — |
| Fiber loss (Outside plant) | — | — | — | 8.0 |
| Splice loss (Outside plant) | — | — | — | 11.2 |
| TOTAL LOSS (dB) DBR (Power ≈ 10 mw) DBR/w OA (Power ≈ 150 wm) | 3.05 | −5.65 | 0.6 | 28.8 |

$^{(1)}$signal loss through 16 × 16 coupler ≈ 15 db
assume MMF interconnect loss ≈ 3dB
$^{(2)}$ONU MON Δ SIG bypasses 16 × 16 star coupler

We claim:

1. An optical communication network which comprises at least a first single-mode optical fiber, to be referred to as a primary fiber, for at least unidirectional transmission, at least at one signal wavelength, to be denoted $\lambda_s$, from a first distribution node to a central office;

a first multiplicity of optical network units, to be referred to as the first ONUs, located remotely from the central office, each ONU capable of transmitting and receiving data at least at the wavelength $\lambda_s$, and each ONU comprising means for synchronizing the ONU transmissions such that a time-division-multiplexed signal is received at the central office;

a first multiplicity of single-mode optical fibers, to be referred to as distribution fibers, for at least unidirectional transmission from the first ONUs to the first distribution node such that each ONU sends data via a respective one of the first distribution fibers; and first coupling means, located at the first distribution node, for passively combining transmissions from the first ONUs into the first primary fiber; CHARACTERIZED IN THAT:

a) the first coupling means comprise a first coupler, to be referred to as a first Stage-1 coupler, which has a proximal end which includes at least one proximal port and a distal end which includes a plurality of distal ports;

b) each first distribution fiber is optically coupled to one of the distal ports, and the first primary fiber is optically coupled to the proximal port of said coupler;

c) the network further comprises a monitor;

d) the network further comprises a first plurality of bypass lines, each said bypass line comprising an optical fiber having proximal and distal ends, the distal end optically coupled to a corresponding one of the first distribution fibers and the proximal end optically coupled to the monitor such that portions of at least some transmissions are received by the monitor without passing through the first Stage-1 coupler;

e) the monitor comprises means for discriminating received transmissions based on a variable selection criterion; and f) the network further comprises passive optical means, optically coupled to the monitor and to one or more first bypass lines, for conforming transmissions in said bypass line or lines to a given value of the selection criterion.

2. The network of claim 1, wherein:

a) the primary fiber is adapted for bidirectional transmission between the central office and the first distribution node;

b) each distribution fiber is adapted for bidirectional transmission between the first distribution node and a respective one of the ONUs; and c) the first coupling means are further adapted for passively splitting transmissions from the central office into the first distribution fibers.

3. The network of claim 2, wherein:

a) the selection criterion comprises wavelength;

b) each of the first distribution fibers is associated with one of a multiplicity of predetermined monitor wavelengths different from the wavelength $\lambda_s$;

c) the network further comprises a first multiplicity of coupling elements, each adapted to optically couple the distal end of a first bypass line to a corresponding first distribution fiber with respect to the respective, associated monitor wavelength;

d) the network further comprises first spectrally selective means for optically coupling the first primary fiber to: (i) the proximal port of the first Stage-1 coupler, relative to the wavelength $\lambda_s$; and (ii) each of the first bypass lines, relative to the respective, associated monitor wavelength;

e) the passive optical conforming means comprise the first coupling elements and the first spectrally selective means;

f) the first coupling elements and/or the first spectrally selective means are adapted such that transmissions at any of the monitor wavelengths do not substantially pass through the first Stage-1 coupler; and g) the monitor comprises a variable wavelength OTDR transmitter optically coupled to the first primary fiber.

4. The network of claim 3, wherein each of the first coupling elements comprises a 5-dB coupler; the first Stage-1 coupler has plural proximal ports; and the network further comprises:

a) a first multimode loopback fiber, to be referred to as a Stage-1 loopback fiber, having a proximal and a distal end, the proximal end optically coupled to the monitor; and b) means for optically coupling the distal end of the first Stage-1 loopback fiber to at least one proximal port of the first Stage-1 coupler, exclusive of the port to which the first primary fiber is coupled.

5. The network of claim 1, wherein:

a) the primary fiber, to be referred to as an inbound primary fiber, is adapted for unidirectional transmission from the first distribution node to the central office;

b) each distribution fiber, to be referred to as an inbound distribution fiber, is adapted for unidirectional transmission from a respective one of the ONUs to the first distribution node;

c) the network further comprises at least one single-mode optical fiber, to be referred to as an outbound primary fiber, for unidirectional transmission from the central office to the first distribution node;

d) the network further comprises a first multiplicity of single-node optical fibers, to be referred to as outbound distribution fibers, for unidirectional transmission from the first distribution node to the ONUs such that each ONU receives data via a respective one of the first outbound distribution fibers;

e) the first coupler, to be referred to as a first inbound Stage-1 coupler, is adapted for coupling unidirectional transmissions from the ONUs to the central office;

f) the first coupling means further comprise a first coupler, to be referred to as a first outbound Stage-1 coupler, which has plural distal ports and at least one proximal port, and which is adapted for coupling unidirectional transmissions from the central office to the ONUs;

g) the outbound primary fiber is optically coupled to the proximal port of the first outbound Stage-1 coupler; and h) each of the outbound distribution fibers is optically coupled to one of the distal ports of the first outbound Stage-1 coupler.

6. The network of claim 2 or claim 5, wherein the first Stage-1 coupler is a fused fiber coupler or a silicon optical bench star coupler having $2^n$ proximal ports and $2^n$ distal ports, the proximal and distal ports are interconnected by n sequential stages of $2\times 2$ fused fiber couplers, the last stage is the stage nearest the distal ports, and n is a positive integer.

7. The network of claim 6, wherein: n equals 4; there are sixteen proximal ports, including four ports to be referred to as high-bandwidth input ports; each high-bandwidth input port is coupled to four distal ports through only the last two of the four coupler stages; and no two high-bandwidth input ports are coupled to the same distal port.

8. The network of claim 7, wherein precisely one of the proximal ports is individually coupled to all sixteen of the distal ports, and the remaining proximal ports, exclusive of the high-bandwidth input ports, are collectively coupled to all sixteen of the distal ports.

9. The network of claim 5, wherein:

a) the selection criterion comprises wavelength;

b) each of the first inbound and outbound distribution fibers is associated with one of a multiplicity of predetermined monitor wavelengths different from the wavelength $\lambda_s$;

c) the network further comprises a first multiplicity of inbound coupling elements, each adapted to optically couple the distal end of a first inbound bypass line to a corresponding first inbound distribution fiber with respect to the respective, associated monitor wavelength;

d) the network further comprises a first multiplicity of outbound coupling elements, each adapted to optically couple the distal end of a first outbound bypass line to a corresponding first outbound distribution fiber with respect to the respective, associated monitor wavelength;

e) the network further comprises first inbound spectrally selective means for optically coupling the first inbound primary fiber to: (i) the proximal port of the first inbound Stage-1 coupler, relative to the wavelength $\lambda_s$; and (ii) each of the first inbound bypass lines, relative to the respective, associated monitor wavelength;

f) the network further comprises first outbound spectrally selective means for optically coupling the first outbound primary fiber to: (i) the proximal port of the first outbound Stage-1 coupler, relative to the wavelength $\lambda_s$; and (ii) each of the first outbound bypass lines, relative to the respective, associated monitor wavelength;

g) the passive optical conforming means comprise the first inbound and outbound coupling elements and the first inbound and outbound spectrally selective means;

h) the first inbound coupling elements and/or the first inbound spectrally selective means are adapted such that transmissions at any of the monitor wavelengths do not substantially pass through the first inbound Stage-1 couplers;

i) the first outbound coupling elements and/or the first outbound spectrally selective means are adapted such that transmissions at any of the monitor wavelengths do not substantially pass through the first outbound Stage-1 couplers; and j) the monitor comprises a variable wavelength OTDR transmitter, a variable wavelength OTDR receiver, and means for optically coupling the transmitter and receiver to the first outbound primary fiber or the first inbound primary fiber.

10. The network of claim 9, wherein each of the first coupling elements comprises a 5-dB coupler; the first inbound Stage-1 coupler has plural proximal ports; and the network further comprises:

a) a first multimode loopback fiber, to be referred to as a Stage-1 loopback fiber, having a proximal and a distal end, the proximal end optically coupled to the monitor; and b) means for optically coupling the distal end of the first Stage-1 loopback fiber to at least one proximal port of the first inbound Stage-1 coupler, exclusive of the port to which the first inbound primary fiber is coupled.

11. The network of claim 3 or 9, wherein each of the first coupling elements comprises a coarse wavelength-division multiplexer.

12. The network of claim 3 or 9, wherein each spectrally selective means comprises a fine wavelength-division multiplexer.

13. The network of claim 12, further comprising a monolithic silicon substrate having a principal surface, wherein at least one first Stage-1 coupler, at least one said first multiplicity of coupling elements, and at least one said fine wavelength-division multiplexer are formed on the principal surface.

14. The network of claim 3 or 9, further comprising:

a) at least one second primary fiber optically coupled, via a second Stage-1 coupler, to a second multiplicity of distribution fibers, each said distribution fiber associated with a predetermined monitor wavelength;

b) a Stage-2 coupler having plural proximal and distal ports, one first and at least one second primary fiber optically coupled to a respective distal port of the Stage-2 coupler;

c) a secondary, single-mode optical fiber for at least unidirectional transmission from the Stage-2 coupler to the central office, said fiber optically coupled to one of the proximal ports of the Stage-2 coupler; and wherein d) associated with the monitor wavelength transmissions from each relevant distribution fiber is a known transmission delay which at least partially identifies that distribution fiber.

15. The network of claim 14, wherein:
a) the monitor wavelength associated with each second distribution fiber is also the monitor wavelength associated with a corresponding first distribution fiber;
b) the network further comprises a Stage-2 multimode loopback fiber having a proximal and a distal end, the proximal end optically coupled to the monitor; and
c) the network further comprises means for optically coupling the distal end of the Stage-2 loopback fiber to at least one proximal port of the Stage-2 coupler, exclusive of the port to which the secondary fiber is coupled.

16. The network of claim 14, further comprising:
a) at least first and second Stage-2 bypass lines, each having a proximal and a distal end;
b) means for optically coupling the distal end of each Stage-2 bypass line to a respective primary fiber, with respect to at least some monitor wavelengths; and
c) means for optically coupling the proximal end of each Stage-2 bypass line to the secondary fiber, relative to at least some monitor wavelengths, such that monitor-wavelength transmissions pass between the primary and secondary fibers without substantially passing through the Stage-2 coupler.

17. The network of claim 16, wherein:
a) each primary, secondary, and distribution fiber is adapted for bidirectional transmission;
b) the means for optically coupling the proximal and/or distal ends of the Stage-2 bypass lines are adapted such that a monitor-wavelength transmission can pass between the secondary fiber and each primary fiber only if the transmission has a wavelength which is associated with at least one of the distribution fibers optically coupled to that primary fiber;
c) associated with each multiplicity of distribution fibers is a set of monitor wavelengths, each comprising at least one monitor wavelength, all of said sets being disjoint; and
d) any two distribution fibers which share the same monitor wavelength are associated with distinct monitor-wavelength transmission delays.

18. The network of claim 17, wherein:
a) the first multiplicity of distribution fibers consists of sixteen fibers divided into four groupings of four fibers each;
b) the second multiplicity of distribution fibers consists of sixteen fibers divided into four groupings of four fibers each; and
c) a unique monitor wavelength is associated with each grouping.

19. The network of claim 1, wherein:
a) the network further comprises a first multimode loopback fiber, to be referred to as a Stage-1 loopback fiber, having proximal and distal ends;
b) the first Stage-1 coupler has plural proximal ports; the proximal end of said loopback fiber is optically coupled to the monitor, and the distal end is optically coupled to at least one proximal port of the first Stage-1 coupler, exclusive of the port to which the first primary fiber is coupled, such that a portion of each ONU transmission is received by the monitor via the first Stage-1 coupler;
c) the proximal end of each first bypass line is optically coupled to the first Stage-1 loopback fiber such that portions of at least some ONU transmissions are received by the monitor means without passing through the first Stage-1 coupler;
d) the selection criterion comprises transmission delay relative to transmissions via the first Stage-1 coupler, and the passive optical conforming means comprise an optical transmission medium providing a known delay associated with each of the first bypass lines;
e) the monitor is adapted to receive transmissions at the wavelength $\lambda_s$ and comprises correlation means for detecting delayed signal pulses, received via the first bypass lines, at the known transmission delays.

20. The network of claim 19, further comprising:
a) at least one second, primary fiber for at least unidirectional transmission from a second distribution node to the central office;
b) at least one second multiplicity of ONUs;
c) at least one second multiplicity of distribution fibers for at least unidirectional transmission from the second ONUs to the second distribution node;
d) at least one second Stage-1 coupler located at the second distribution node, said coupler having plural proximal and distal ports;
e) means for optically coupling each second distribution fiber to one of the distal ports and means for optically coupling the second primary fiber to one of the proximal ports of the second Stage-1 coupler;
f) at least one second Stage-1 loopback fiber having proximal and distal ends, the proximal end optically coupled to the monitor and the distal end optically coupled to at least one proximal port of the second Stage-1 coupler, exclusive of the port to which the second primary fiber is coupled;
g) at least one second plurality of fiber optic bypass lines, each said bypass line optically coupled at its distal end to one of the second distribution fibers and at its proximal end to the second Stage-1 loopback fiber such that portions of at least some second ONU transmissions are received by the monitor without passing through the second Stage-1 coupler, a known transmission delay being associated with each of the second bypass lines;
h) a secondary, single-mode optical fiber in optically transmissive relationship with the central office, and a Stage-2 coupler for combining ONU transmissions from the first and second primary fibers into the secondary fiber;
i) a Stage-2 loopback fiber optically coupled to the monitor;
j) multimode combining means for combining ONU transmissions from the first and second Stage-1 loopback fibers into the Stage-2 loopback fiber without adding substantial relative delays between the respective transmissions; and
k) at least one Stage-2 bypass line, optically coupled at one end to the second Stage-1 loopback fiber, and optically coupled at the other end to the Stage-2 loopback fiber such that portions of at least some second ONU transmissions are received by the monitor without passing through the multimode combining means, a known transmission delay being associated with the Stage-2 bypass line, said delay being sufficient to distinguish delayed signals associated with the second plurality of bypass lines from delayed signals associated with the first plurality of bypass lines.

21. The network of claim 19, wherein each ONU has an assigned time slot, the monitor comprises a monitor detector which produces an output voltage which is approximately proportional to the optical power received by the monitor detector, and the monitor further comprises:
a) a peak detector having an input which is coupled to the output of the monitor detector and which produces an output voltage;
b) a comparator having an input which is coupled to the output of the peak detector and is adapted to produce a deactuating output if the peak detector output voltage exceeds a predetermined threshold; and
c) means for activating an indicator that the received optical power in at least one identified time slot is abnormally low, only if the deactuating output is absent during all of the time slot.

22. The network of claim 19, wherein the correlation means comprise:
a) a threshold detector coupled to the output of the monitor detector and adapted to produce a digital bit stream in response to the monitor detector output;
b) means for delaying the bit stream by a variable amount of time selectable from a set of delays, each of the selectable delays identified with a given ONU time slot;
c) means for comparing the delayed bit stream with output from the monitor detector which is undelayed or subjected to a fixed delay, the comparison means adapted to associate a given degree of correlation with a given delay and a given time slot; and
d) means for indicating each time slot in which a high degree of correlation occurs at a delay which is not identified with that time slot.

23. The network of claim 22, wherein the comparison means comprise:
a) for each selectable delay, a low-pass filter having an output, and a digital switch adapted to gate the monitor detector output into the low-pass filter whenever the value of the bit stream at that delay is high; and
b) multiple-input comparator means coupled to the outputs of all of the low-pass filters, the comparator means adapted to determine, in each time slot, the delay at which the maximum correlation occurs, excluding the delay identified with that time slot.

24. The network of claim 19, wherein the monitor further comprises:
a) means for subtracting the delayed signal pulses from the monitor detector output, such that a corrected output signal having predetermined ranges for the 1 and 0 voltage levels is produced;
b) comparator means for producing an actuating signal if the corrected output signal level lies outside of the 0 and 1 ranges by at least a predetermined margin; and
c) means for determining the duration of the actuating signal, such that a faulty, continuously transmitting ONU can be at least partially identified by the actuating signal duration.

25. The network of claim 24, wherein a data rate is associated with the monitor detector output; and the duration-determining means comprise a digital counter which is clocked at the data rate.

26. The network of claim 19, further comprising a monolithic silicon substrate having a principal surface, wherein the first Stage-1 coupler is formed on the principal surface, and further comprising a single-mode-to-multimode coupler formed on the principal surface for coupling the proximal ends of the first bypass lines to the first Stage-1 loopback fiber.

27. The network of claim 19, wherein each of the first distribution fibers is associated with one of a multiplicity of predetermined monitor wavelengths different from the wavelength $\lambda_s$, the network further comprising:
a) a variable wavelength OTDR transmitter optically coupled to the first primary fiber;
b) a second plurality of bypass lines, each said bypass line comprising an optical fiber having proximal and distal ends, the distal end optically coupled to one of the first distribution fibers and the proximal end optically coupled to the OTDR transmitter such that portions of at least some OTDR transmissions are received by the first distribution fibers without passing through the first Stage-1 coupler;
c) a first multiplicity of coupling elements, each adapted to optically couple the distal end of a second bypass line to a corresponding first distribution fiber with respect to the respective, associated monitor wavelength; and
d) first spectrally selective means for optically coupling the first primary fiber to: (i) the proximal port of the first Stage-1 coupler, relative to the wavelength $\lambda_s$; and (ii) each of the second bypass lines, relative to the respective, associated monitor wavelength; and wherein
e) the first coupling elements and/or the first spectrally selective means are adapted such that transmissions at any of the monitor wavelengths do not substantially pass through the first Stage-1 coupler.

* * * * *